US012783204B2

(12) United States Patent
Han et al.

(10) Patent No.: US 12,783,204 B2
(45) Date of Patent: Nov. 3, 2026

(54) DISPLAY DEVICE, AND CONTROL METHOD FOR DISPLAY DEVICE

(71) Applicant: HISENSE VISUAL TECHNOLOGY CO., LTD., Qingdao (CN)

(72) Inventors: Zheng Han, Qingdao (CN); Lifei Yan, Qingdao (CN); Zhaofeng Pian, Qingdao (CN); Yu Duan, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 46 days.

(21) Appl. No.: 18/988,227

(22) Filed: Dec. 19, 2024

(65) Prior Publication Data

US 2025/0130755 A1 Apr. 24, 2025

Related U.S. Application Data

(63) Continuation of application No. PCT/CN2023/092604, filed on May 6, 2023.

(30) Foreign Application Priority Data

Jul. 7, 2022 (CN) ........................ 202210803145.X
Aug. 15, 2022 (CN) ........................ 202210977484.X
Sep. 28, 2022 (CN) ........................ 202211194198.2

(51) Int. Cl.
*H04N 21/4405* (2011.01)
*G06F 3/14* (2006.01)
(Continued)

(52) U.S. Cl.
CPC ....... *G06F 3/1454* (2013.01); *H04N 21/4405* (2013.01); *H04N 21/443* (2013.01); *H04N 21/485* (2013.01); *H04N 21/6334* (2013.01)

(58) Field of Classification Search
CPC .......... G06F 3/1454; G06F 3/14; G06F 9/445; H04N 21/4405; H04N 21/443;
(Continued)

(56) References Cited

U.S. PATENT DOCUMENTS

2013/0283393 A1* 10/2013 Hierro ..................... G06F 21/10 726/27
2015/0334562 A1* 11/2015 Perold ................... H04W 12/06 713/186
(Continued)

FOREIGN PATENT DOCUMENTS

CN 101110669 A 1/2008
CN 108595137 A 9/2018
(Continued)

OTHER PUBLICATIONS

The China National Intellectual Property Administration (CNIPA) The First Office Action for Chinese Application 202210803145.X Mar. 24, 2026 12 Pages (With Translation).
(Continued)

*Primary Examiner* — Cynthia M Fogg
(74) *Attorney, Agent, or Firm* — ANOVA LAW GROUP, PLLC

(57) ABSTRACT

Disclosed are a display apparatus and a control method. The display apparatus includes: a communicator including a Wi-Fi module and a Bluetooth module and configured to communicate with a casting data source device; a display; a memory; and a processor. The processor is configured to perform: in response to a channel-switching instruction, switching from a current channel to a casting channel; in response to a casting instruction, checking a network status of the Wi-Fi module and a casting switch status; in response to the network status indicating that the network is disconnected, controlling the Wi-Fi module to enable network connection and to connect to a target network; and/or in
(Continued)

response to the casting switch status indicating that a casting switch is off, controlling the casting switch to be turned on; and obtaining casting data via the target network, and displaying the casting data on an interface for the casting channel.

16 Claims, 20 Drawing Sheets

(51) Int. Cl.
*H04N 21/443* (2011.01)
*H04N 21/485* (2011.01)
*H04N 21/6334* (2011.01)

(58) Field of Classification Search
CPC ............. H04N 21/485; H04N 21/6334; H04N 21/436; H04N 21/43615; H04N 21/43637; H04N 21/4363; H04N 21/4122; H04N 21/4622; H04N 13/363; H04W 12/06
USPC ............................................................ 725/31
See application file for complete search history.

(56) References Cited

U.S. PATENT DOCUMENTS

| | | | | |
|---|---|---|---|---|
| 2017/0110083 | A1* | 4/2017 | Yanazume | G06F 3/0425 |
| 2018/0213478 | A1* | 7/2018 | Baron | H04L 69/14 |
| 2018/0241609 | A1* | 8/2018 | Rombakh | H04L 67/56 |
| 2018/0268869 | A1* | 9/2018 | Nakagawa | H04N 21/4316 |
| 2019/0069015 | A1* | 2/2019 | Kiley | H04W 8/005 |
| 2019/0320219 | A1* | 10/2019 | Yoden | H04N 21/47217 |
| 2020/0037025 | A1* | 1/2020 | Zerr | H04N 21/43637 |
| 2021/0303253 | A1* | 9/2021 | Hwang | G06Q 20/02 |
| 2021/0409831 | A1* | 12/2021 | Murray | H04N 21/2668 |
| 2023/0367441 | A1* | 11/2023 | Gao | G06F 3/1454 |
| 2024/0406482 | A1* | 12/2024 | Lin | G06F 3/1454 |

FOREIGN PATENT DOCUMENTS

| | | | | |
|---|---|---|---|---|
| CN | 111464844 A | 7/2020 | | |
| CN | 111935518 A | 11/2020 | | |
| CN | 112243141 A | 1/2021 | | |
| CN | 113207144 A | 8/2021 | | |
| CN | 113778360 A | 12/2021 | | |
| CN | 114143371 A | 3/2022 | | |
| CN | 114244542 A | 3/2022 | | |
| CN | 114500082 A | 5/2022 | | |
| CN | 115454367 A | 12/2022 | | |
| JP | 2002358060 A | 12/2002 | | |
| WO | 2019205618 A1 | 10/2019 | | |
| WO | 2021057830 A1 | 4/2021 | | |
| WO | 2021073224 A1 | 4/2021 | | |
| WO | 2021212668 A1 | 10/2021 | | |
| WO | WO-2024001257 A1 | * | 1/2024 | H04N 21/41 |

OTHER PUBLICATIONS

The World Intellectual Property Organization (WIPO) International Search Report for PCT/CN2023/092604 Jun. 14, 2023 6 Pages (including translation).

China National Intellectual Property Administration (CNIPA) Office Action 1 for Application No. 202210977484.X Apr. 24, 2026 23 Pages (including translation).

* cited by examiner

DISPLAY DEVICE, AND CONTROL METHOD FOR DISPLAY DEVICE

CROSS-REFERENCE TO RELATED APPLICATIONS

This application is a continuation application of International Application No. PCT/CN2023/092604 filed May 6, 2023, which claims priority to Chinese Patent Application No. 202211194198.2, filed on Sep. 28, 2022, Chinese Patent Application No. 202210977484.X, filed on Aug. 15, 2022, and Chinese Patent Application No. 202210803145.X, filed on Jul. 7, 2022, in the China National Intellectual Property Administration. The entire contents of all the above applications are incorporated herein by reference.

TECHNICAL FIELD

The disclosure relates to the field of multimedia technology, and in particular to a display apparatus and a control method for a display apparatus.

BACKGROUND

With the development of smart products, applications for connecting smart terminals to televisions and projecting display are becoming increasingly common. Currently, when users want to cast audio and video from a mobile phone to a television, they may encounter issues such as the phone being unable to detect the television, or the television screen going black after casting. This results in a high failure rate for casting, impacting the user experience.

SUMMARY

The disclosure provides a display apparatus, including: a communicating device which includes a Wi-Fi module and a Bluetooth module and is configured to communicate with a casting data source device; a display configured to display an image from a broadcast system and/or a network, and/or a user interface; a memory configured to store computer instructions and data associated with the display; and a processor communicating with the communicating device, the display, and the memory. The processor is configured to execute the computer instructions to cause the display apparatus to perform: in response to a channel-switching instruction, switching from a current channel to a casting channel; in response to receiving a casting instruction from the casting data source device, checking a network status of the Wi-Fi module and a casting switch status; in response to the network status indicating that the network is disconnected, controlling the Wi-Fi module to enable network connection and to connect to a target network; and/or in response to the casting switch status indicating that a casting switch is off, controlling the casting switch to be turned on; and obtaining casting data sent from the casting data source device via the target network and controlling the display to display the casting data on an interface for the casting channel.

This disclosure further provides a control method for a display apparatus, including: in response to a channel-switching instruction, switching from a current channel to a casting channel; obtaining a casting instruction from the casting data source device; in response to the casting instruction, checking a network status of the Wi-Fi module and a casting switch status; in response to the network status indicating that the network is disconnected, controlling the Wi-Fi module to activate a network and to connect to a target network; and/or, in response to the casting switch status indicating that casting switch is off, controlling the casting switch to be turned on and obtaining a casting data sent from the casting data source device via the target network; and controlling the display to display the casting data on an interface for the casting channel.

DETAILED DESCRIPTION

Figure 1:
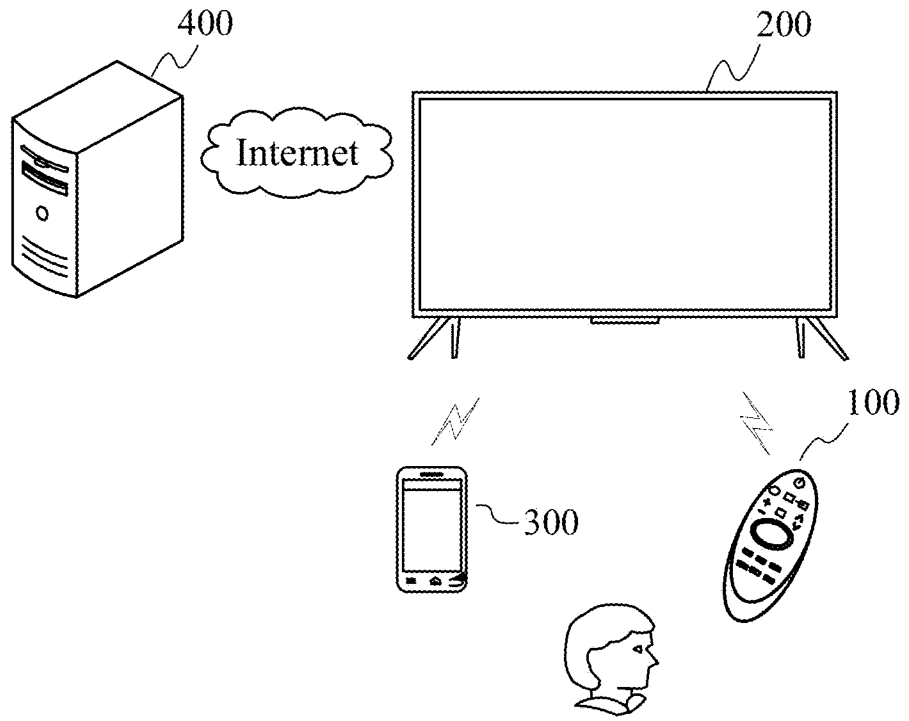
FIG. 1 shows a scenario according to some embodiments.

FIG. 1 shows a scenario according to some embodiments of the disclosure. As shown in FIG. 1, it shows a control device 100, display apparatus 200, a smart device 300, and a server 400. The user can operate the display apparatus 200 using either the smart device 300 or control device 100 to play audio and video resources on the display apparatus 200.

Figure 2:
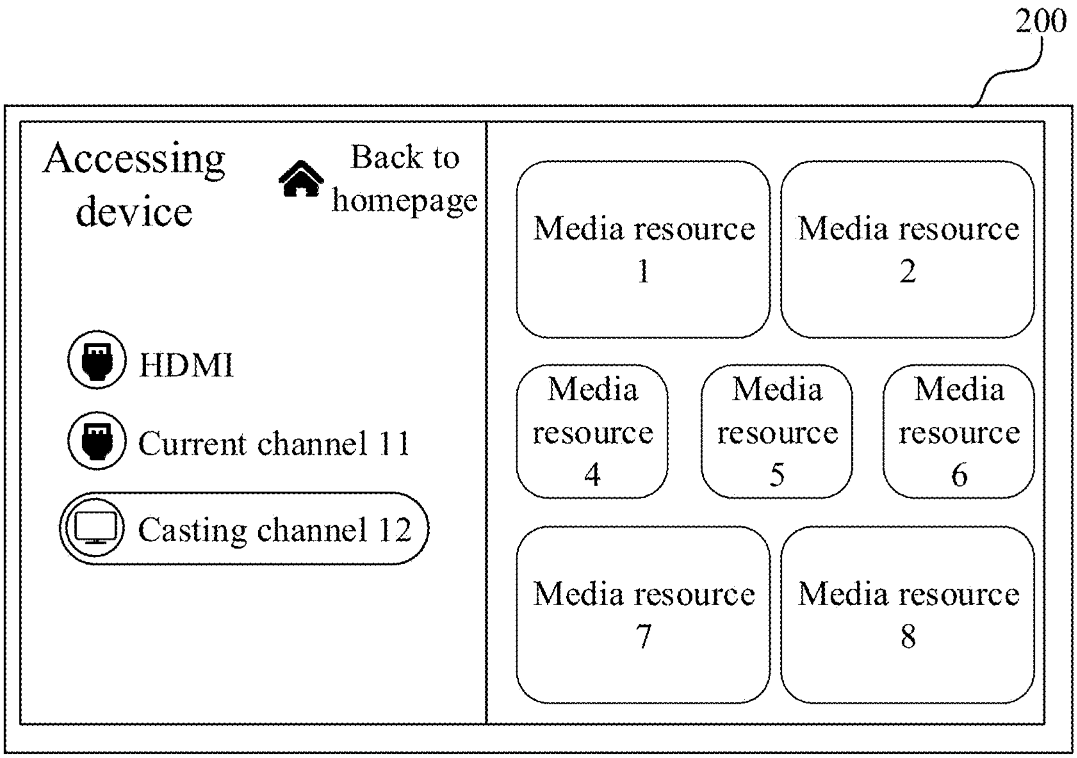
FIG. 2 shows a first schematic diagram of a user interface of a display apparatus according to some embodiments.

Taking the example of the user operating the display apparatus 200 via the smart device 300, the smart device 300 connects with the display apparatus 200 via Bluetooth. The user can switch the display apparatus from a current channel to a casting channel via the smart device 300. The smart device 300 can send a channel-switching instruction to the display apparatus 200 over Bluetooth. Referring to FIG. 2 which is a first schematic diagram of a user interface of the display apparatus. As shown in the figure, after receiving the channel-switching instruction, the display apparatus 200 switches from the current channel 11 to the casting channel 12 in response to the channel-switching instruction. In one embodiment, the current channel is the HDMI1 channel as shown in FIG. 2, and the casting channel may be an air casting channel.

After switching to the casting channel, the user can control the display apparatus 200 to play audio and video from the smart device 300 while the display apparatus is on the casting channel. In embodiments of the disclosure, the user can send a casting command to the display apparatus 200 via the smart device 300, and the display apparatus 200, in response to the casting command, obtaining a network status of the Wi-Fi module and a casting switch status, and determining whether the smart device 300 and display apparatus 200 are on the same local area network (LAN) and whether the casting function on the display apparatus 200 is enabled. If the network status indicates that the network is disconnected, it means the display apparatus 200 is not connected to a network, so the display apparatus 200 will enable the network connection. If the casting switch is off, the display apparatus will turn the switch on to activate casting functionality on the display apparatus 200. This ensures that when the network connection and casting function are both enabled, the display apparatus 200 can receive casting data from the smart device 300 over a target network and display the casting data on an interface for the casting channel 12.

In the scenario where the user uses the smart device 300 to operate the display apparatus 200 for casting audio and video from the smart device, the display apparatus 200 can check the network and the casting switch statuses to prevent casting failures caused by network or casting switch being off. This ensures that the casting function is enabled and the network connection is normal, allowing the smart device 300 to discover and cast to the display apparatus 200, significantly improving casting success and enhancing user experience.

In some embodiments, the control device 100 may be a remote control, and can communicate with the display apparatus 200 via infrared protocol, Bluetooth protocol, wireless, or other wired methods, to control the display apparatus 200. A user can input commands through keys, voice input and control panel input on the remote control, to control the display apparatus 200. In some embodiments, other smart devices, tablets, computers, and laptops can also be used to control the display apparatus 200.

In some embodiments, the smart device 300 and the display apparatus 200 can be installed with software applications and connect with each other based on communication protocols, achieving one-to-one control and data communication. The audio and video content displayed on the smart device 300 can be sent to the display apparatus 200, providing a synchronized display function. The display apparatus 200 can also communicate with the server 400 via various communication methods, allowing communication over a local area network (LAN), wireless LAN (WLAN), and other networks. Server 400 can provide various content and interaction to the display apparatus 200. Display apparatus 200 can be a liquid crystal display, OLED display, or projection display device. Besides providing broadcast TV functionality, the display apparatus 200 can also support smart network TV functionality with computer support.

Figure 3:
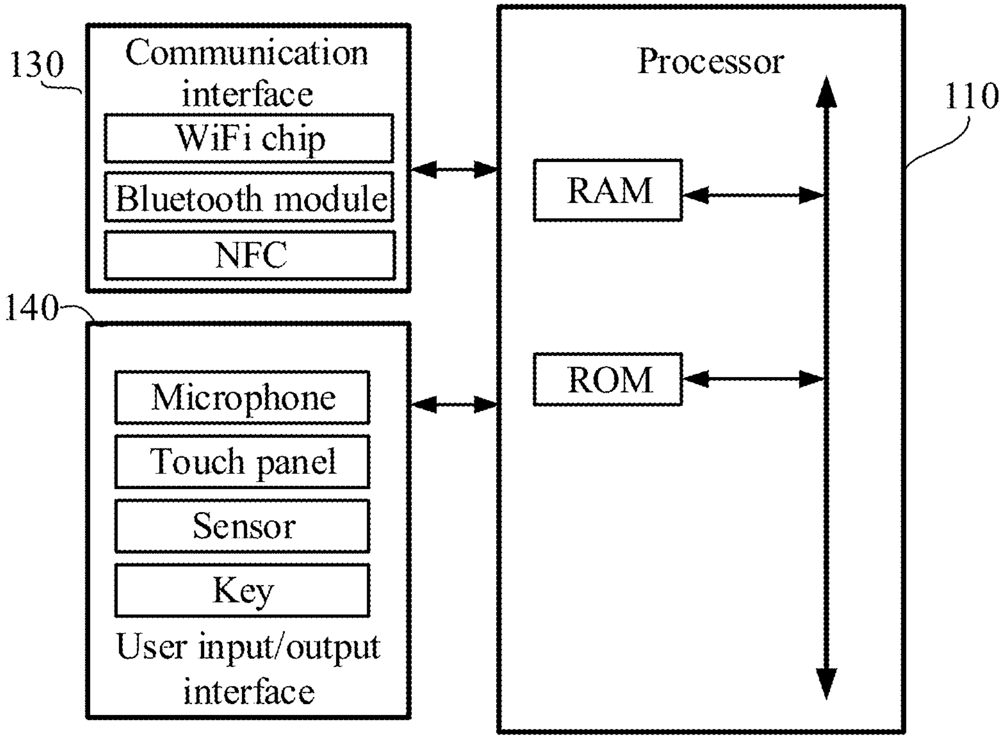
FIG. 3 shows a configuration block diagram of a control device according to some embodiments.

FIG. 3 shows a configuration block diagram of the control device 100 according to some embodiments of the disclosure. As shown in FIG. 3, the control device 100 can include a processor 110, a communication interface 130, a user input/output interface 140, a memory, and a power supply. The control device 100 can receive operation commands input from the user and convert them into instructions recognizable by the display apparatus 200, acting as an intermediary in user-display apparatus interaction. The communication interface 130 facilitates external communication, including at least one of WiFi chips, Bluetooth modules, NFC, or alternative modules. The user input/output interface 140 can include at least one of a microphone, touchpad, sensor, button, or alternative modules.

Figure 4:
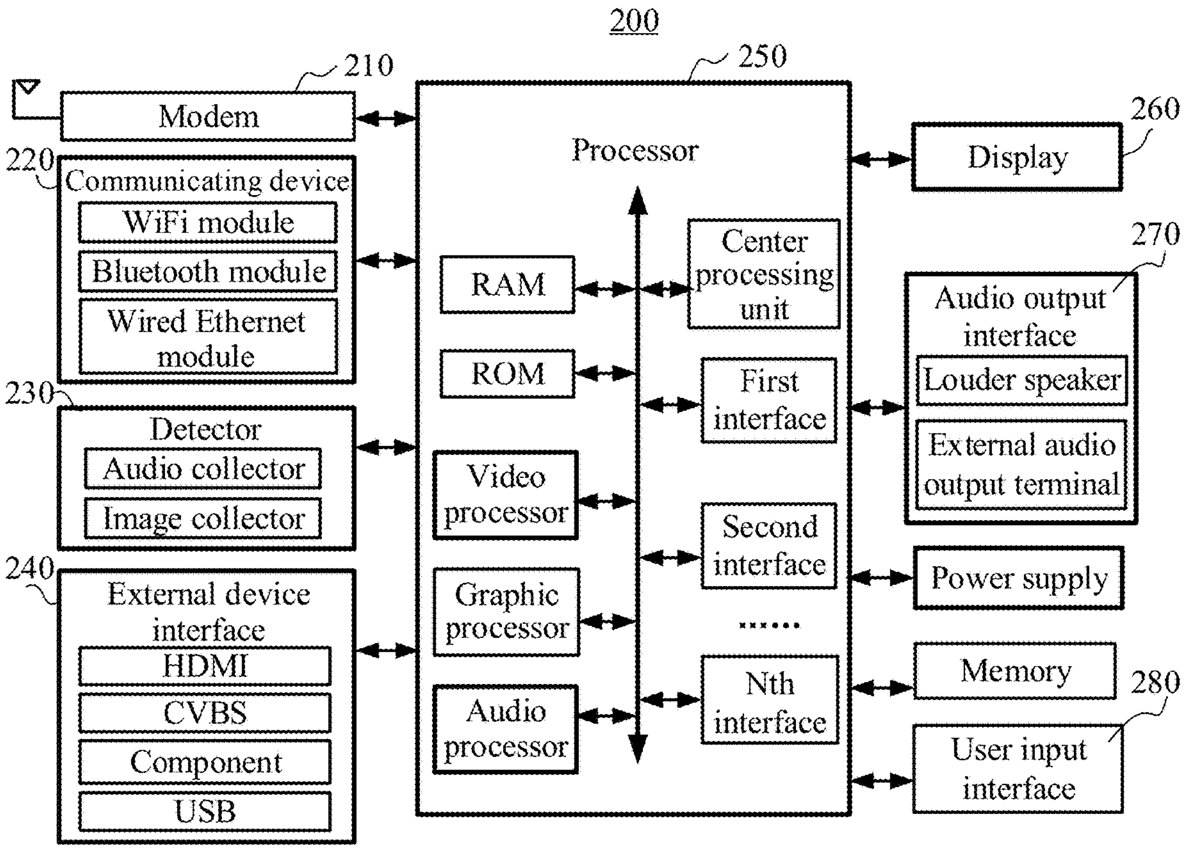
FIG. 4 shows a hardware configuration block diagram of a display apparatus according to some embodiments.

FIG. 4 shows a hardware configuration block diagram of the display apparatus 200 according to some embodiments of the disclosure. As shown in FIG. 4, the display apparatus 200 can include: a modem 210, a communicating device 220, a detector 230, an external device interface 240, a processor 250, a display 260, an audio output interface 270, a memory, and a power supply. The processor 250 can include a central processor, video processor, audio processor, graphics processor, RAM, and ROM. The display 260 can be at least one of a liquid crystal display, OLED display, touch display, or projection display, or can be a projection device and projection screen. The modem 210 can receive broadcast television signals via wired or wireless methods and demodulates audio and video signals as well as EPG data signals from various broadcast television signals. The detector 230 can collect signals from external environments or interactions. The processor 250 and modem 210 can be in separate devices, meaning that modem 210 can be in an external device, like an external set-top box, connected with the apparatus containing processor 250.

In some embodiments, the display apparatus described above is a terminal apparatus with display functionality, such as a television, mobile phone, computer, or learning device.

In some embodiments, the processor 250 can control the display apparatus' work and respond to user's operation through various software control programs stored in memory. The processor 250 can control the overall operation of display apparatus 200. Users can input commands via a graphical user interface (GUI) displayed on display 260, and the user input interface can receive the users' commands through the GUI. Alternatively, users may input commands by specific voice or gesture, and the user input interface can receives the users' commands by recognizing these inputs via sensors. The output interface (display 260 and/or audio output interface 270) can be configured to output user interaction information. The communicating device 220 can allow communication with the server 400 or other devices following communication protocols.

Embodiments of the disclosure provide a display apparatus, including a communicating device, a display, a memory and a processor. The communicating device includes a Wi-Fi module and a Bluetooth module and is configured to communicate with a casting data source device. The display is configured to display images and/or a user interface from a broadcast system and/or network. The memory stores computer instructions and data related to the display. The processor communicates with the communicating device, the display, and the memory. The processor is configured to execute the computer instructions to cause the display apparatus to perform: in response to a channel-switch instruction, switching from a current channel to a casting channel; in response to a casting instruction from the data source device, checking a network status of the Wi-Fi module and a casting switch status; in response to the network status indicating that the network is disconnected, controlling the Wi-Fi module to enable the network connection and to connect to a target network; and/or, in response to the casting switch status indicating that the casting switch is off, turning on the casting switch; and obtaining a casting data from the data source device over the target network and controlling the display to display the casting data on an interface for the casting channel.

After switching to the casting channel, the display apparatus can obtain a casting instruction from the data source device and, in response to the casting instruction, check the network status and the casting switch status. In response to the network status indicating that the network is disconnected, the display apparatus can enable the network connection and to connect to the target network. And/or, in response to the casting switch status indicating that the casting switch is off, the display apparatus can turn on the casting switch, thus avoiding casting failures due to network or casting issues. When both network connection and casting function are enabled, the display apparatus can obtain the casting data from the data source device over the target network and display the casting data, ensuring successful casting and improving user experience.

In some embodiments, after enabling the network connection and connecting to the target network in response to the network status indicating that the network is disconnected, and before obtaining the casting data from the data source device over the target network and displaying the casting data on the interface for the casting channel, the processor 250 is further configured to cause the display apparatus to perform: controlling the display to display a first prompt indicating that the network connection is being enabled and the network being connected; determining that, within a preset time, the network connection is successful; in response to that the network connection fails, controlling the display to display a network setting interface, which includes a network switch control and an ID list of available networks; receiving an input of selecting a target network ID from the user on the network setting interface and attempting to connect to the target network indicated by the target network ID.

In some embodiments, after checking the network status of the Wi-Fi module and the casting switch status in response to the casting instruction, and before controlling the Wi-Fi module to enable the network connection and connecting to the target network, the processor 250 is further configured to cause the display apparatus to perform: based on the network being disconnected, controlling the display to display the network setting interface, where the network setting interface includes a network switch control and an identifier (ID) list of available networks; and obtaining a first input for enabling the network connection on the network switch control on the network setting interface from the user.

The processor 250 is configured to cause the display apparatus to enable the network connection by controlling the Wi-Fi module to enable the network connection and to connect to the target network.

In some embodiments, after checking the network status and the casting switch status in response to the casting instruction, and before controlling the casting switch to be turned on, the processor 250 is configured to cause the display apparatus to perform: in response to the casting switch status indicating that the casting switch is off, displaying a casting switch setting interface, where the casting switch setting interface includes a casting switch control; and obtaining a second input for turning on the casting switch on the casting switch control in the casting switch setting interface.

The processor 250 is configured to cause the display apparatus to turn on the casting switch in response to the second input.

In some embodiments, after checking the network status and the casting switch status, and before obtaining the casting data sent from the terminal device and controlling the display to display the casting data, the processor 250 is configured to cause the display apparatus to perform: checking a resource update status in response to the casting instruction; based on that the resource update status indicates no resource update, downloading a casting resource of a target version; and performing resource updating based on the casting resource of the target version.

In some embodiments, the casting resource can include a casting key. The processor 250 is configured to cause the display apparatus to obtain the casting data sent from the terminal device and controlling the display to display the casting data by decrypting the casting data sent from the data source device using the updated casting key, and controlling the display to display the decrypted casting data.

Figure 5A:
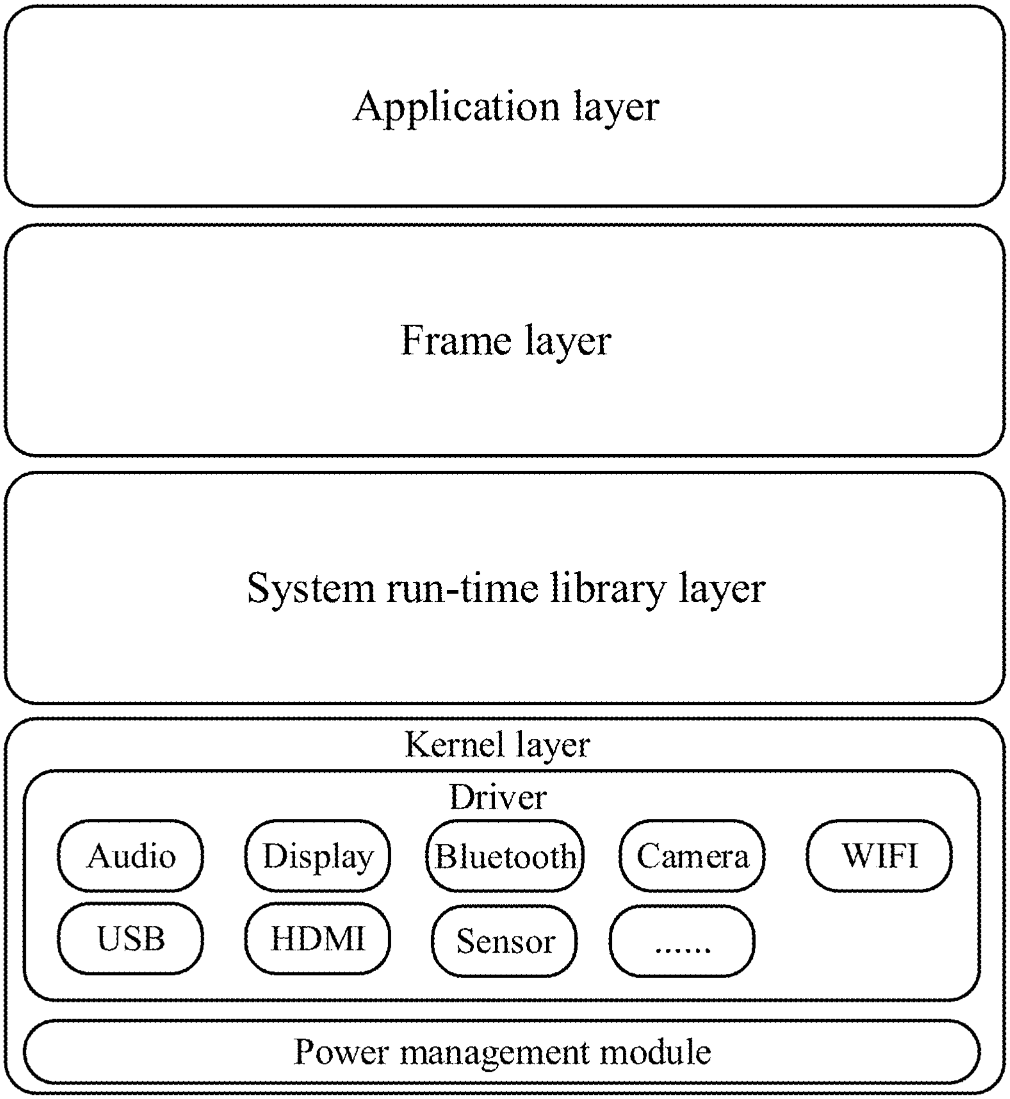
FIG. 5A shows a software configuration block diagram of a display apparatus according to some embodiments.

FIG. 5A shows a software configuration diagram of display apparatus 200 according to one or more embodiments of the disclosure. As shown in FIG. 5A, the system can be divided into four layers from top to bottom: an applications layer, an application framework layer, an Android runtime and system libraries (system library layer), and a kernel layer. The kernel layer can include at least one of the following drivers: an audio driver, a display driver, a Bluetooth driver, a camera driver, a Wi-Fi driver, a USB driver, an HDMI driver, a sensor driver (e.g., fingerprint, temperature, pressure sensors), and a power driver.

Figure 5B:
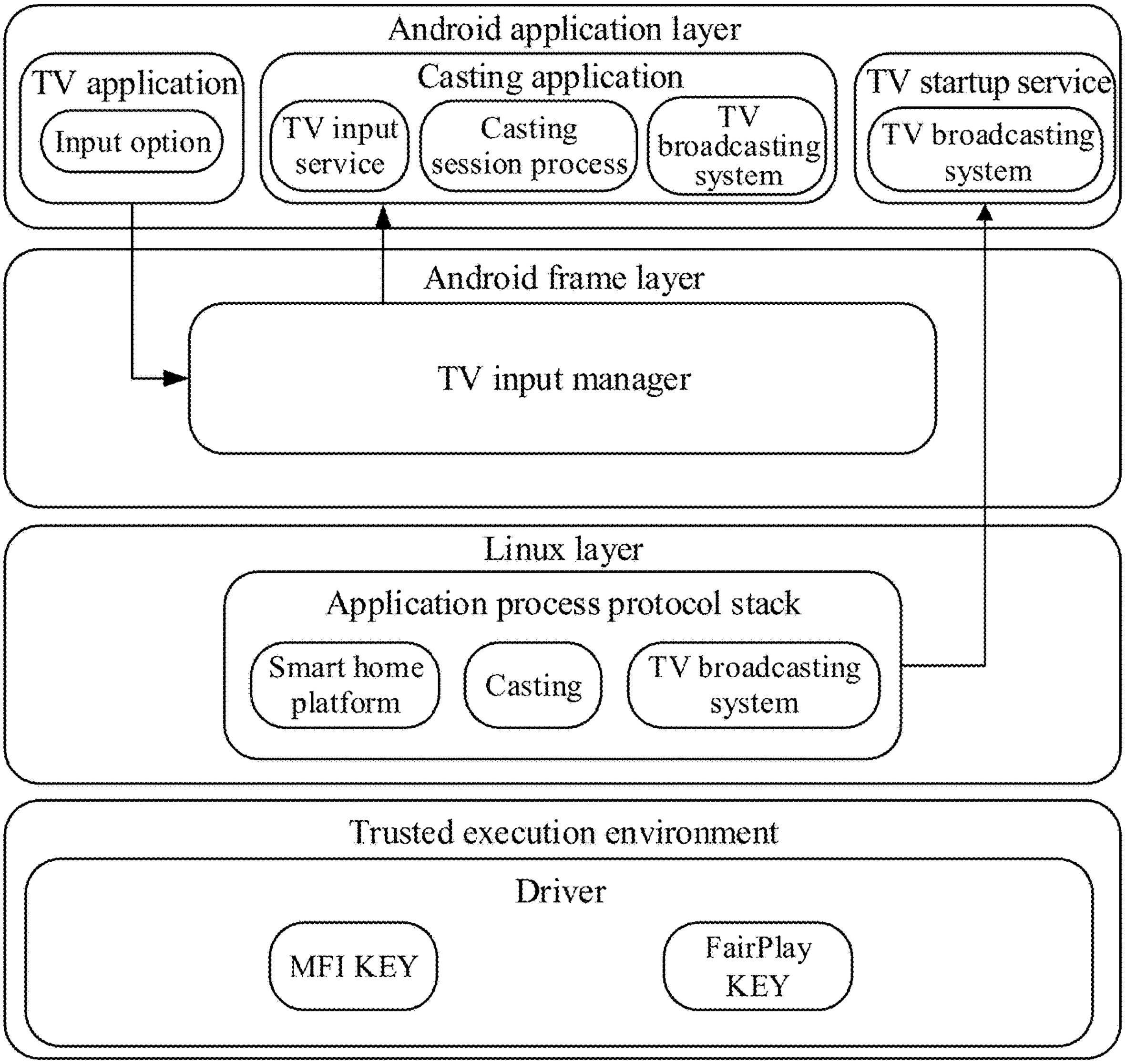
FIG. 5B shows a system frame diagram of a display apparatus according to some embodiments.

FIG. 5B shows a system framework diagram of the display apparatus according to some embodiments of the disclosure. The system can include an Android application layer, an Android framework layer (Android Framework), a Linux layer, and a Trusted Execution Environment (TEE). The Android application layer includes a TV application (TVApp), casting application (such as AIRPLAY™ APP, which allows sharing content from another terminal wirelessly), and TV launch service. The Android framework layer can include a TV input manager, and the Linux layer includes an application process protocol stack. The Trusted Execution Environment is commonly used for Digital Rights Management (DRM), mobile payments, and sensitive data protection, and in the disclosure, is used for storing casting keys like the MFI KEY and FairPlay KEY.

In embodiments of the disclosure, the TV application is responsible for showing input devices of the display apparatus in list form, and communicates with the TV input manager in the Android framework layer to complete channel switching. When the user clicks on an icon of a channel, the TV input manager can determine the network status and the casting switch status. The casting application is responsible for the specific business logic of the casting channel, platform layer interface implementation (PAL_Impl), and key processing. The casting launch service can communicate with the application process protocol stack, and update the system property value with the casting switch status whenever the switch changes. The TV application can read this property value to proceed with the next logical steps. The TV input manager is a native class in the Android architecture, and the TV application communicates with the TV input module provided by the device manufacturer or other providers via the TV input manager.

Figure 6:
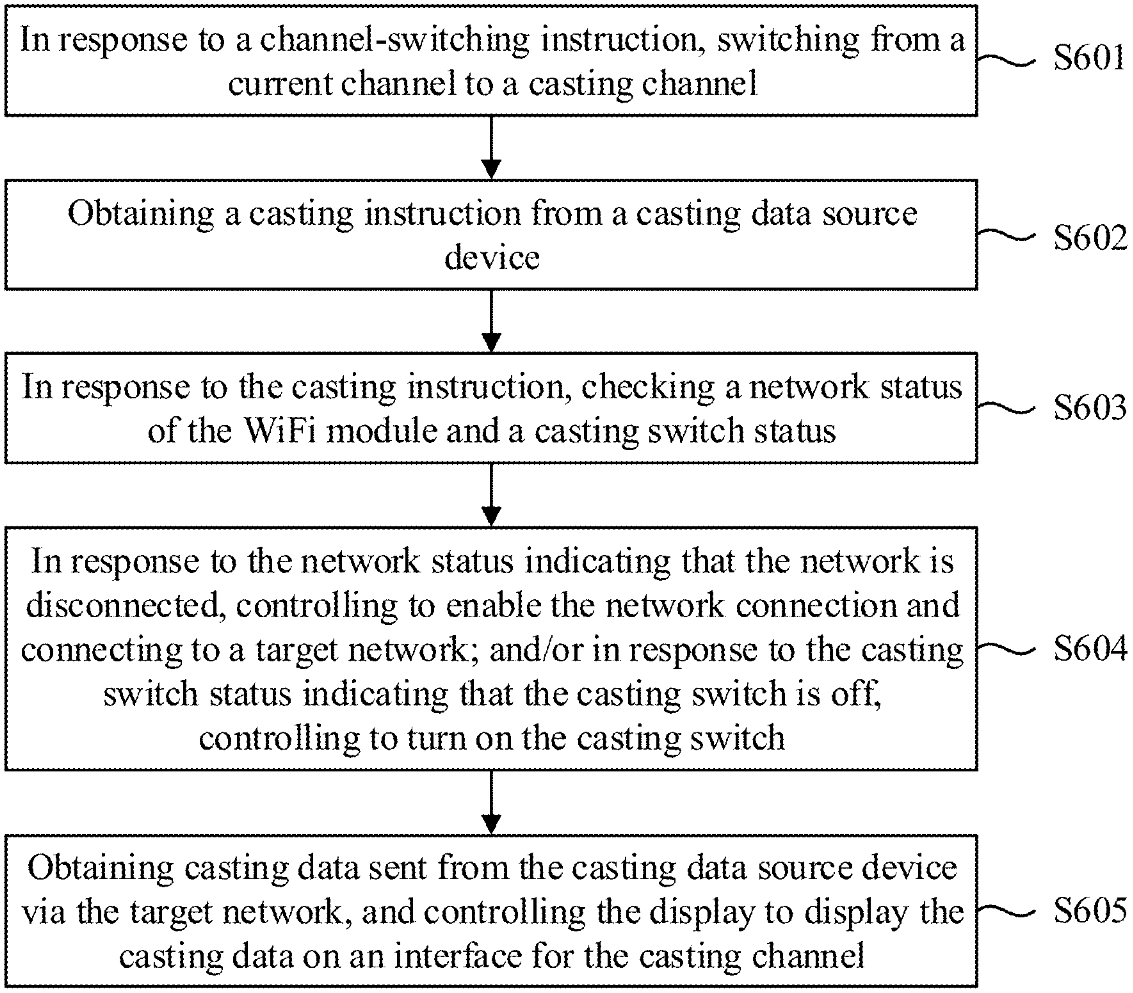
FIG. 6 shows a schematic flowchart of a control method for a display apparatus according to some embodiments.

To further illustrate the embodiments, an example embodiment is provided in conjunction with FIG. 6. It should be understood that the steps in FIG. 6 may include more or fewer steps in actual implementation, and the sequence of these steps may vary to achieve the control method for the display apparatus provided in the embodiments of the disclosure.

As shown in FIG. 6, which is a flowchart of a control method for a display apparatus according to embodiments of the disclosure, the method is applied to a display apparatus and includes the following steps S601~S605.

S601: in response to a channel-switch instruction, switching from a current channel to a casting channel.

The control method for the display apparatus in embodiments of the disclosure applies to a display apparatus that acts as a device for receiving casting data and communicates with the casting data source device via Wi-Fi and Bluetooth.

In some embodiments, the channel-switch instruction may be input by the user on the display apparatus's channel interface. For example, referring to FIG. 2, the display apparatus is on the current channel 11, and the user selects casting channel 12 on the current channel interface, and a channel-switch instruction is generated, which indicates that the user wishes to switch from current channel 11 to casting channel 12. The display apparatus then responds to the channel-switch command by switching from the current channel to the casting channel.

It should be noted that the current channel differs from the casting channel and can be an input channel of the display apparatus, such as an HDMI (High Definition Multimedia Interface), which will not be described in details.

S602: obtaining a casting instruction sent by the casting data source device.

In some embodiments, when the display apparatus is on the casting channel, it waits for the casting data source device to send the casting instruction.

S603: in response to the casting instruction, checking a network status of the Wi-Fi module and a casting switch status.

In some embodiments, after the display apparatus receives the casting instruction from the data source device, it checks the network status and the casting switch status in response to the casting instruction. Here, checking the network status refers to checking the network status of the Wi-Fi module on the display apparatus, which could be checking whether the Wi-Fi connection function is enabled by the display apparatus.

In some embodiments, casting failures may be caused by outdated casting resource configurations on the display apparatus. Embodiments of the disclosure provide a method in which, after receiving the casting instruction from the data source device, the display apparatus checks the resource update status in response to the casting instruction. Based on that the resource update status indicates no resource update, the display apparatus downloads the casting resource of a target version of from the server and performs the resource update based on the casting resource of the target version, to update the configured casting resource of the display apparatus to the target version, allowing the display apparatus to successfully receive casting data from the data source device.

In some embodiments, casting failure may occur if the casting keys of the display apparatus and the data source device do not match. After determining that the resource update status indicates no resource update and downloading the casting resource of the target version in response to the casting instruction, the display apparatus update the casting key in the display apparatus based on a casting key included in the casting resource of the target version, to match the casting key of the data source device, improving the chances of successful casting.

S604: in response to the network status indicating that the network is disconnected, enabling the network connection and to connect to a target network; and/or, in response to the casting switch status indicating that casting switch is off, turning on the casting switch.

In some embodiments, after checking the network status and the casting switch status, if the network status indicates that the network is disconnected, even the casting switch status shows casting switch as on, since a casting failure may occur due to the network being disconnected, the display apparatus enables the network connection and connects to the target network.

It should be noted that the target network can either be a previously connected network of the display apparatus or a manually connected network by the user.

In some embodiments, if the network status indicates that the network is disconnected, the display apparatus can control the display to show a network status setting interface, which includes a network switch control and an ID list of available networks. The network switch control is used for indicating the network status to be connected or disconnected, and the IDs of available networks can be displayed in a list.

Figure 7:
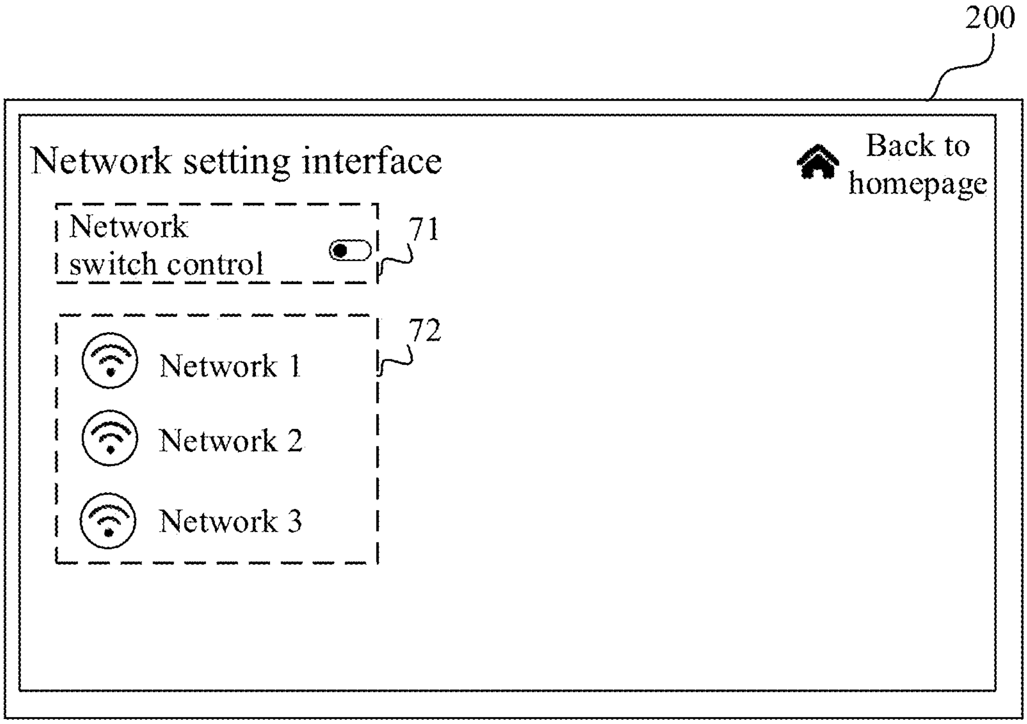
FIG. 7 shows a schematic diagram of a network setting interface according to some embodiments.

FIG. 7 shows a schematic diagram of the network status setting interface, which includes a network switch control 71 and an ID list 72 of available networks.

In some embodiments, when the network status indicates that the network is disconnected, the display apparatus first controls the display to show a first dialog (dialog) to prompt the user to check the network connection. The first dialog includes a cancel control and a confirm control.

Figure 8:
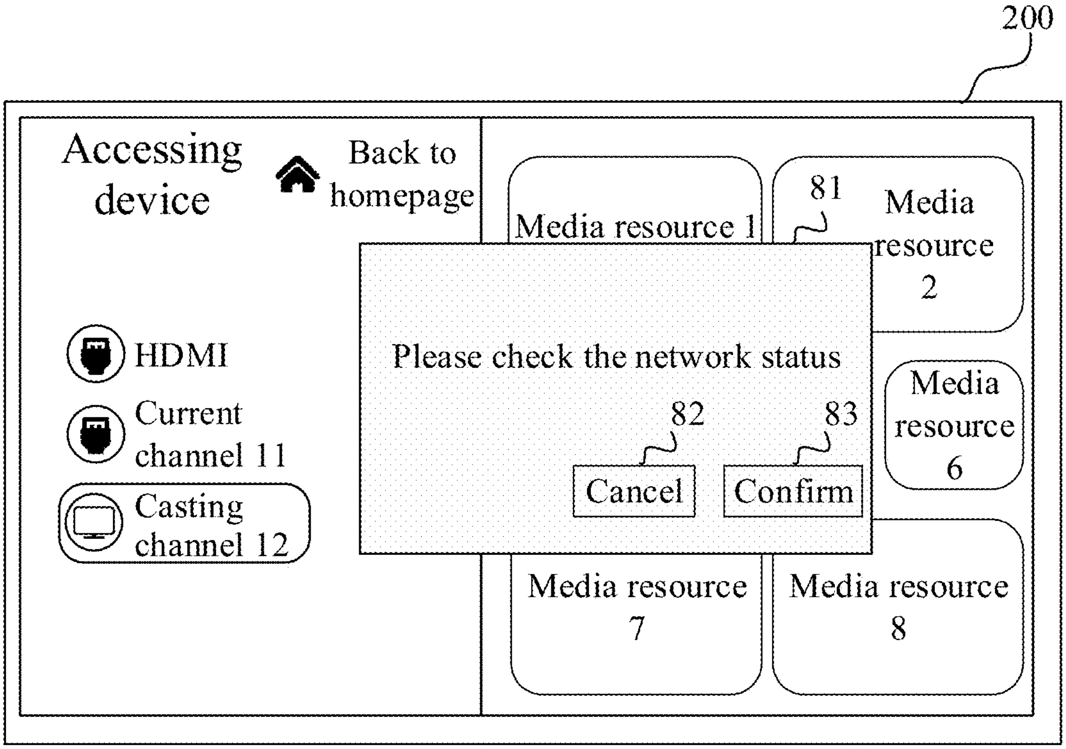
FIG. 8 shows a second schematic diagram of a user interface of a display apparatus according to some embodiments.

FIG. 8 shows a second schematic diagram of a user interface of the display apparatus. As shown in FIG. 8, in the case that the network status indicates that the network is disconnected, the display apparatus controls the display to show a first dialog 81. The first dialog 81 prompts "Please check the network status" and includes a cancel control 82 and a confirm control 83.

After receiving a selection input on the confirm control in the first dialog from the user, the display apparatus controls the display to show the network status setting interface.

Figure 9:
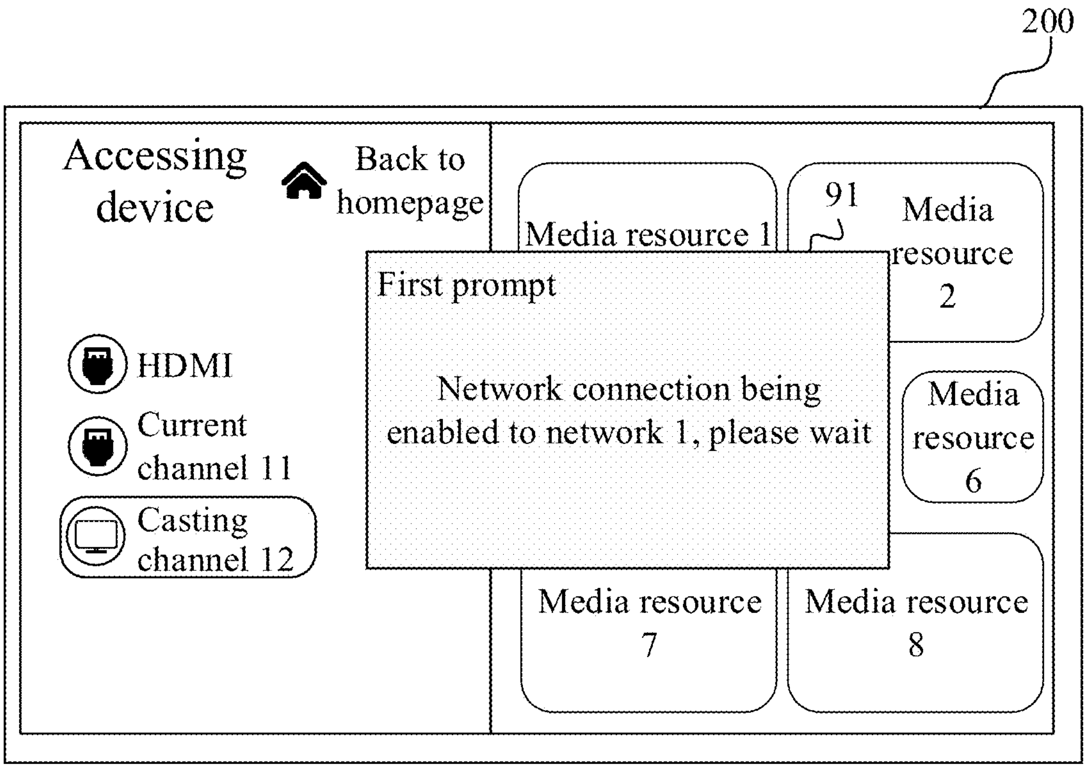
FIG. 9 shows a third schematic diagram of a user interface of a display apparatus according to some embodiments.

In some embodiments, the display apparatus controls the display to show a first prompt indicating that the network connection is being enabled, as shown in FIG. 9. FIG. 9 shows a third schematic diagram of a user interface of the display apparatus, showing the first prompt 91, which may indicate "Enabling network connection to Network 1, please wait." In some embodiments, whether the network connection is successful is checked within a preset time after showing the first prompt. The connection being successful indicates that casting function can be enabled, and the process moves to step S605. Based on that the connection fails, the display apparatus controls the display to show the network status setting interface.

In any of the above embodiments, after displaying the network status setting interface, the display apparatus receives a selection input on a target network identifier in the network status setting interface. In response to the input, the display apparatus attempts to connect to the target network indicated by the target network identifier.

In some embodiments, if the network status indicates that the network is disconnected, the display apparatus shows the network status setting interface, handing control over to the user. The display apparatus obtains the a first input to the network switch control in the network status setting interface, where the first input indicates changing the network switch from an off state to an on state. The display apparatus then enables the network connection in response to the first input.

In some embodiments, the display apparatus may enable the network connection and connect to the target network without user awareness. Typically, the target network is a first network among the multiple available networks for the display apparatus, and the display apparatus connects to this network by default. In one embodiment of the disclosure, after enabling the network connection and connecting to the target network, the display apparatus checks if the network connection is successful within a preset time. If the connection fails, the display apparatus shows the network status setting interface to receive a selection input on a target network identifier from the user, then connects to the target network selected by the user in response to the input.

In the embodiments described above, when the network status indicates that the network is disconnected, the display apparatus either displays the network status setting interface with user awareness, allowing the user to operate the network switch control and choose the target network, or it enables the network connection and connects to the target network without user awareness. In one embodiment of the disclosure, the network connection is checked, and if network connection fails, the display apparatus then displays the network status setting interface to receive the selection input on the target network from the user, thereby meeting the user's requirement to connect to the selected network. As such, the network status can indicate the network is connected and indicate a normal connection, which facilitates successful casting.

Figure 10:
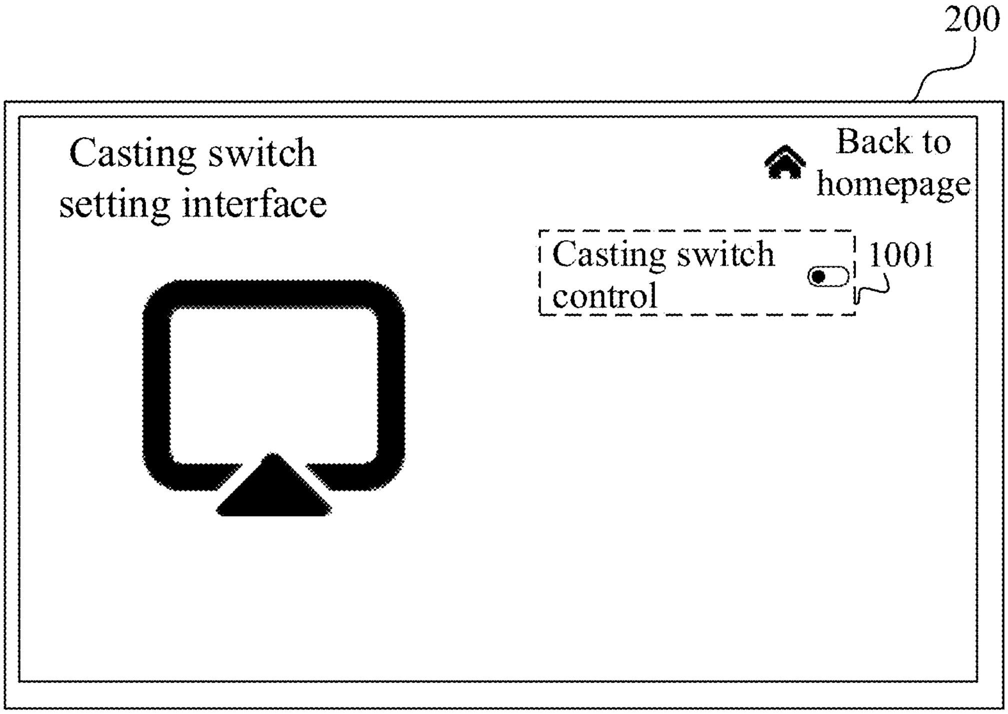
FIG. 10 shows a schematic diagram of a casting switch setting interface according to some embodiments.

In some embodiments, if the casting switch status indicates that the casting switch is off and the network is connected after checking the network status and the casting switch status, casting failure may occur since the casting switch is off. To avoid this, embodiments of the disclosure provides a method in which, if the casting switch status indicates that the casting switch is off, the display apparatus controls the display to display the casting switch setting interface. The casting switch setting interface can include a casting switch control, as shown in FIG. 10 which shows a casting switch setting interface including a casting switch control 1001 according to embodiments of the disclosure. Further, a second input to the casting switch control in the casting switch setting interface can be obtained, and the second input indicates turning on the casting switch, to enable the casting functionality of the display apparatus. The display apparatus can turn on the casting in response to the second input.

In some embodiments, if the casting switch status indicates that the casting switch is off, the display apparatus can turn on the casting switch without user awareness.

In above embodiments, if the casting switch status indicates that the casting switch is off, the casting switch interface can be displayed to obtain the second input to the casting switch control, to turn on the casting switch; alternately, the display apparatus can turn on the casting switch directly, to avoid a casting failure due to the casting switch being off.

If the network status and the casting switch status indicate that the network is disconnected and the casting switch is off, casting failure will occur. To achieve a successful casting, the display apparatus enables the network connection and connects to the target network, then turns on the casting switch to ensure both network connectivity and casting availability, enhancing the success rate of casting.

S605: obtaining the casting data sent from the data source device via the target network and displaying the casting data on the interface for the casting channel.

In some embodiments, the network status of the display apparatus indicates that the network is connected, and the display apparatus is connected to the data source device through the target network. The casting switch status indicates that the casting switch is on, and the casting function is enabled. This allows normal casting on the display apparatus. To meet the user's needs, the display apparatus obtains the casting data sent from the data source device via the target network and displays the casting data on the interface for the casting channel.

In summary, the control method for display apparatus according to embodiments of the disclosure can be applied to a display apparatus. First, in response to a channel-switching instruction, the display apparatus switches from the current channel to the casting channel. The display apparatus then obtains the casting instruction and, in response to the casting instruction, checks the Wi-Fi module's network status and the casting switch status. When the network status indicates that the network is disconnected, the display apparatus enables the network connection, and/or when the casting switch is off, the display apparatus turns on the casting switch, ensuring that when both the network connection and casting function are enabled, the display apparatus can successfully obtain the casting data sent from the data source device through the target network and displays the casting data on the interface for the casting channel. This ensures successful casting when the network is connected and the casting function is enabled after checking the network and casting statuses after switching to the casting channel, thus avoiding casting failures due to network or casting switch issues, increasing success casting rates and enhancing user experience.

Content for casting can be transmitted to an air casting-compatible display apparatus. The user can activate the display apparatus's casting feature via the source port provided in the apparatus and display the corresponding casting information, then wait for the user to operate the smart device to connect to the display apparatus for casting. However, there currently exists an issue where the display apparatus does not respond to return instructions received on a page for presenting casting information, which significantly affects user experience.

Based on this, in the embodiments of the disclosure, processing logic for the return button on the control device can be added in the display apparatus, allowing the display apparatus to switch from the page for presenting casting information to a specified page when it receives a return instruction generated when the user pressing the return button on the control device. This solves the issue where the display apparatus does not respond to selections of the return button when displaying page for presenting the casting information. Additionally, the page transition is more in line with the user's habits, improving the user experience with the display apparatus's casting functionality.

Using the application scenario in FIG. 1 as an example, a smart device 300 can connect and communicate with applications installed on the display apparatus 200 through a network communication protocol, allowing one-to-one control operations and data communication. Additionally, audio and video content displayed on the smart device 300 can be transmitted to display apparatus 200 for synchronous display. The display apparatus 200 can also communicate with a server 400 through various communication methods, supporting LAN, WLAN, and other network connections. Server 400 can provide various content and interactive experiences to display apparatus 200. Display apparatus 200 could be an LCD display, OLED display, or projection display apparatus, and it offers not only TV broadcast reception but also smart TV functions that support computer-based operations.

The user can control the display apparatus 200, by operating virtual buttons on the smart device 300 or physical buttons on control device 100, such as the return, home, source, directional, and confirm buttons on a remote control, to control the display apparatus 200 to show specific pages for obtaining information desired by the user or a page of function collection required by the user.

Using a remote control as an example, the user can press a source button to command the display apparatus 200 to display the source page. The source page may show one or more supported signal sources for display apparatus 200, such as Android OS (Home), one or more HDMI interfaces, live TV, and casting. The user can use the remote control to control the display apparatus to switch among these signal sources.

Display apparatus 200 may have multiple HDMI interfaces, and different HDMI interfaces can be used for inputting data from different data sources into the display apparatus. Different HDMI interfaces, as sources, can be distinguished on the source page by unique identifiers.

For casting functions, the smart device 300 initiating the casting serves as the display apparatus's data source, i.e., as a source. The display apparatus decodes the received data from smart device 300 and displays the decoded data. For example, casting is selected as the source, meaning that the air casting functionality in the display apparatus is enabled.

It should be noted that, the smart device 300 (such as a smartphone or tablet) initiating casting function (e.g., initiating air casting) typically needs to be on the same Wi-Fi network as the display apparatus for normal connection to allow the transmission of the data to be displayed.

Figure 11:
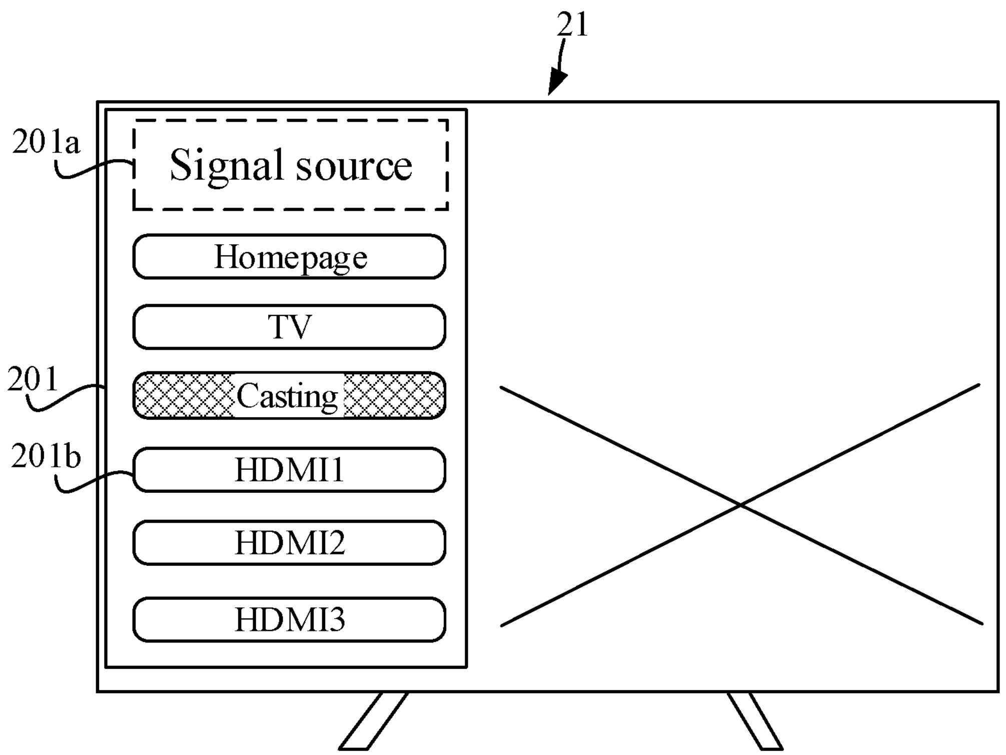
FIG. 11 shows a schematic diagram of a page for presenting signal sources of a display apparatus according to some embodiments.

FIG. 11 shows an example of a user interface 21 displaying the source page. The user interface can include a region 201 for showing the source page. The region 201 may occupy all or part of the display area, and its position, size, color, and text style are not limited in the disclosure. As shown in FIG. 11, the source page is overlayed on the page previously displayed by the display apparatus, near the left edge, with the brightness, color, and transparency of the underlying page adjusted to emphasize the source page.

The region 201 can include a region 201*a* and a plurality of regions 201*b*. The region 201*a* is used for showing the source page title which can be in any language (e.g., "Source" in Chinese in FIG. 11). The regions 201*b* are used for showing sources, and one of regions 201*b* corresponds to one of sources, such as "Home," "Live TV," "Casting," "HDMI1," "HDMI2," and "HDMI3" in FIG. 11. The source selected by the user could be displayed in a different style. For example, the text in the region 201*b* corresponding to the source selected by the user can be made bold and larger, and the region 201*b* can be highlighted with a distinctive color.

Based on the user interface 21 as shown in FIG. 11, from the sources displayed on the source page, the user can select one as a current signal input source for the display apparatus, which then decodes and displays data from that source. For example, the user can select "Live TV" as the current source, and the display apparatus would receive broadcast TV data as the input signal. Alternately, the user selects "Casting" as the current source, and the display apparatus can receive casting data from the smart device initiating casting and decode and display the decoded data.

The device may support multiple casting protocols, such as MIRACAST™ or AIRPLAY™, each with its own standards. For casting based on the air casting protocol, when "Casting" is selected as the source on the source page, the display apparatus 200 will switch to a casting information page as specified by the casting protocol. The casting information page can show information such as the device name and current Wi-Fi network. The casting information page may also include other function entrances, and after navigating to the casting information page, the display apparatus will await user's operations to initiate casting through mirroring or application-based methods on the smart device. Displaying the information of the display apparatus to be connected and the WiFi network ensures that the user can select the correct display apparatus to connect to Wi-Fi network via the smart device, reducing the likelihood of casting failure.

Figure 12:
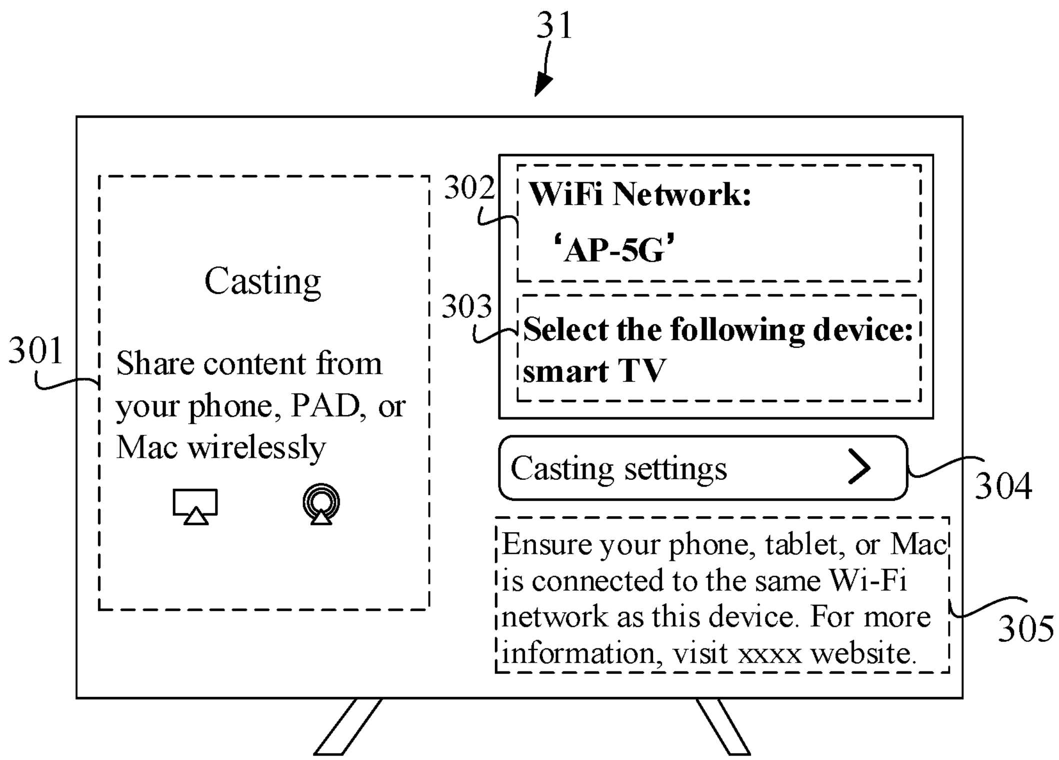
FIG. 12 shows a schematic diagram of a page for presenting casting information of a display apparatus according to some embodiments.

For example, based on the user interface 21 as shown in FIG. 11, if the user selects "Casting" as the source, display apparatus 200 may switch to the user interface 31 shown in FIG. 12, displaying the casting information page. As shown in FIG. 12, the user interface 31 can include a region 301, a region 302, a region 303, an entrance 304 and a region 305.

Here, the region 301 provides an introduction to casting, such as "casting allows sharing content from your phone, tablet, or Mac wirelessly," along with icons associated with casting. The region 302 shows the Wi-Fi network name connected to the display apparatus. The region 303 shows a name of the display apparatus.

The entrance 304 provides access to a casting setting page, where the user can modify the name of the display apparatus or change the Wi-Fi network currently connected by the display apparatus.

The region 305 shows casting-related tips, such as text "Ensure your phone, tablet, or Mac is connected to the same Wi-Fi network as this device. For more information, visit xxxx website."

After entering the casting information page, the display apparatus waits for the user to initiate casting from the smart device. In some embodiments, the user may decide not to proceed with the casting operation and typically would press the return button on the control device. However, in existing display apparatus, when the casting information page is accessed via the source page, pressing the return button on either the smart device 300 or control device 100 to send a return instruction to display apparatus 200 yields no response from the display apparatus. This could make users think the display apparatus has frozen or that there is an issue with the casting feature, which deviates from typical user expectations and results in a poor user experience with the casting function.

To address the issue, in the disclosure, relevant service logic can be added in the display apparatus 200, enabling the display apparatus to respond to return instructions from the casting information page by switching to a specified page. This aligns with user habits and enhances the user experience. The processing logic can be flexibly configured. For instance, it could uniformly return to a specified page in response to the return instruction from the casting information page, which is a simple approach. Alternatively, active data source objects before entering the casting information page can be analyzed, different processing logic can be set for different data sources to better match user habits.

The display apparatus 200 shown in FIG. 4 is taken as an example for illustration. In the disclosure, the communicating device 220 can be configured to receive a return instruction generated based on the user pressing the return button on the control device.

The processor 250 can be configured to, in response to the return instruction, determine whether the display 260 currently displays the casting information page, and based on that the display 260 displays the casting information page, control the display 260 to switch to a specified page.

In some embodiments, the processor 250 can uniformly direct the display to a specified page, such as the desktop of the display apparatus's operating system.

In other embodiments, the processor 250 can control the display, based on an active data source object before directing to the casting information page, to switch to a specified page corresponding to the active data source object, Here, different data sources correspond to different specified pages.

It should be noted that the data source object that is active before entering the source page and starting the casting function via the source entry is a task object to be resumed. This data source object could be any application or signal source installed in the display apparatus's operating system. For example, a user interface provided by the data source object that is active before starting the casting function could include, but not limited to, a desktop or setting page provided by the operating system of the display apparatus, or an internal page, a homepage or setting page of an application installed in the operating system of the display apparatus.

In some embodiments, if the data source object that is active before entering the casting information page is a signal source supported by the display apparatus, the display can be controlled to switch to the operating system (OS) desktop of the display apparatus. If the data source object that is active before entering the casting information page is an application installed in the application layer within the display apparatus's OS, the display can be controlled to switch to that application's homepage. That is, when the casting information page is accessed via the source entry from the OS desktop, HDMI, live TV, or other signal sources, in response to the return instruction generated based on a selection of the return button, the display is directed back to the OS desktop. If the casting information page is accessed via the source entry within an application (such as a video player application), in response to the return instruction generated based on a selection of the return button, the display is directed back to the homepage of the application.

In some embodiments, the processor 250 can be configured to, obtain a custom parameter; determine whether a value of the custom parameter is equal to a preset value; based on that the value of the custom parameter is equal to a preset value, determine that the data source object that is active before entering the casting information page is supported by the display apparatus; and based on that the value of the custom parameter is not equal to a preset value, determine that the data source object that is active before entering the casting information page is an application installed in the application layer of the operating system of the display apparatus.

It should be noted that display apparatus 200 can manage active tasks via an OS-native activity manager. Here, the task refers to collections of all data source objects involved in interaction with the user. In the activity manager, the data source objects are arranged in a stack, i.e., based on activation order of the data source objects. When responding to the return instruction on the casting information page, the data source objects can be managed based on the activity manager's stack, to restore the status of the data source object that needs to be reactivated.

Figure 13:
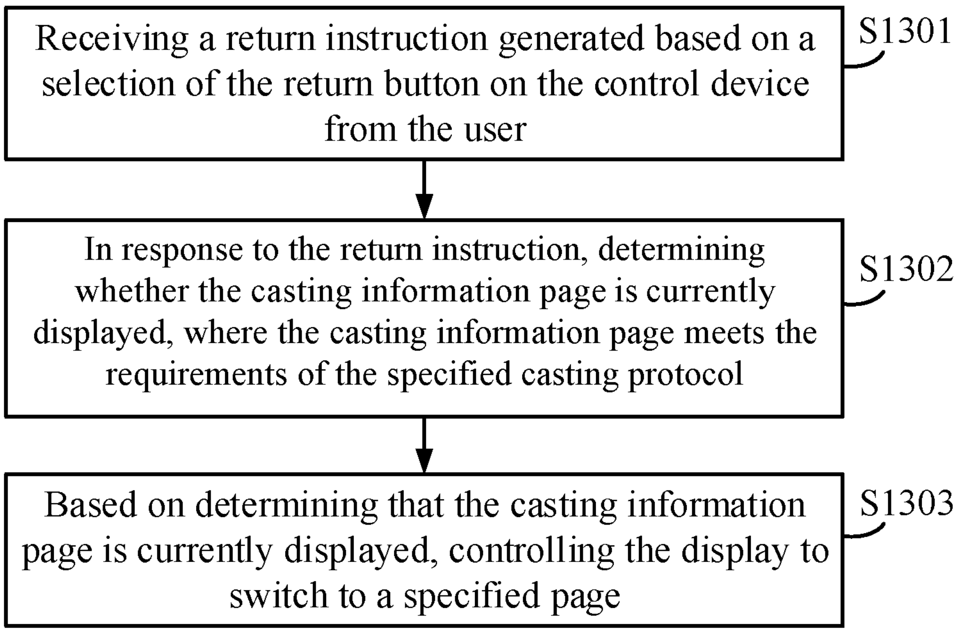
FIG. 13 shows a schematic flowchart of a control method for a display apparatus according to some embodiments.
Figure 14:
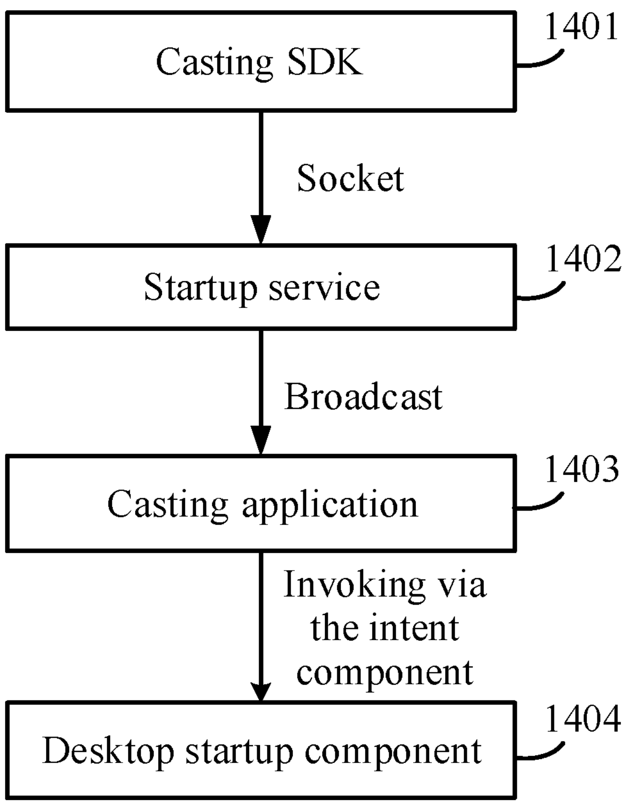
FIG. 14 shows a schematic flowchart of a control method for a display apparatus according to some embodiments.
Figure 15:
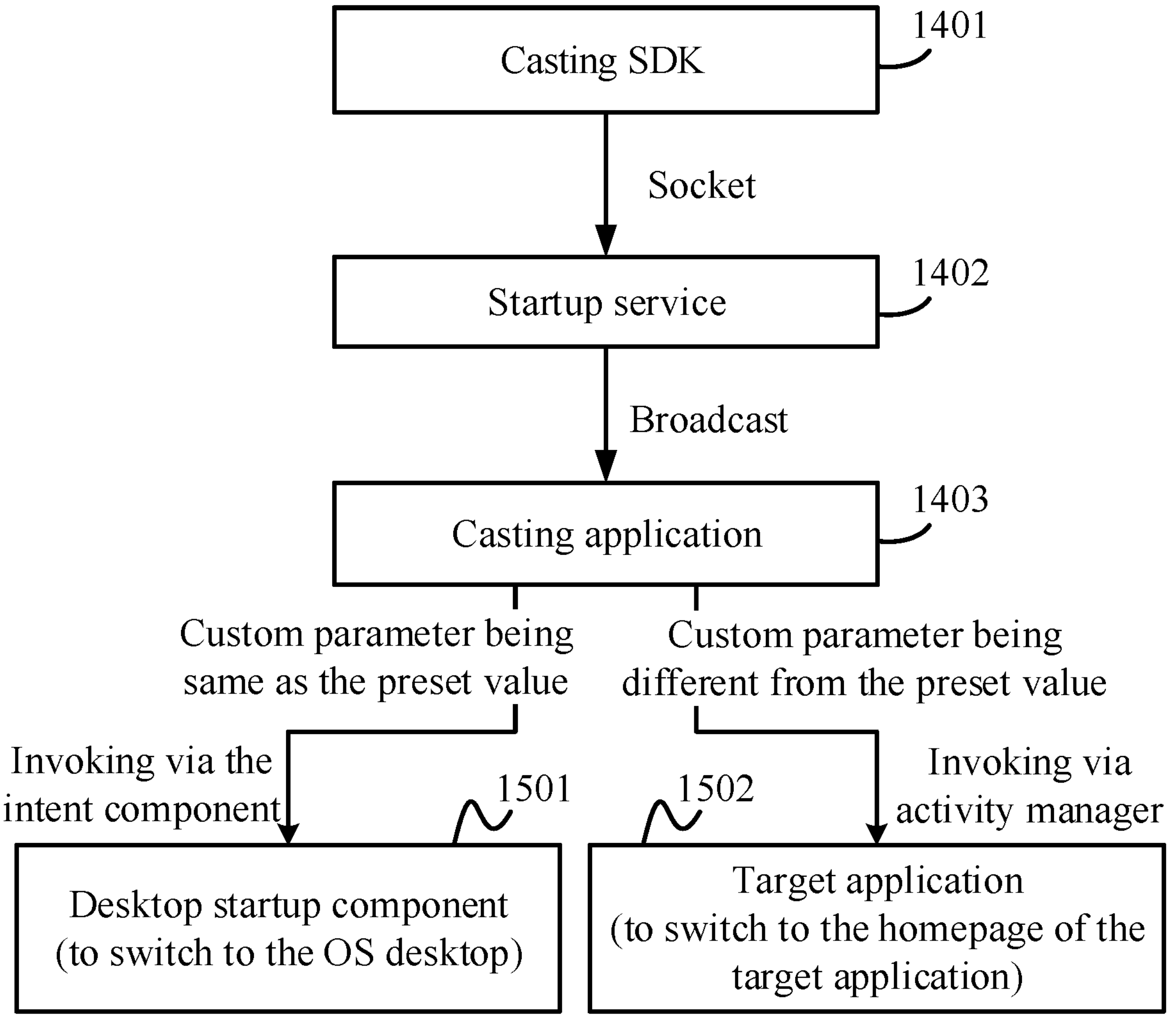
FIG. 15 shows a schematic flowchart of a control method for a display apparatus according to some embodiments.

FIGS. 13 to 15 show the flowcharts of the control method for the display apparatus according to one or more embodiments of the disclosure. As can be seen in FIG. 13, the method in the embodiments includes the following steps.

S1301: receiving a return instruction generated based on a selection of the return button on the control device from the user.

S1302: in response to the return instruction, determining whether the casting information page is currently displayed, where the casting information page meets the requirements of the specified casting protocol.

S1303: based on determining that the casting information page is currently displayed, controlling the display to switch to a specified page.

In accordance with the previous description, there are at least two implementation methods: (1) based on different pre-casting channels leading to the casting information page, switching uniformly to the Android system's desktop; (2) switching to the specified page corresponding to the data source object that is active before entering the casting information page. FIGS. 14 and 15 respectively illustrate the component invocation processes corresponding to the two implementation methods.

Refer to FIGS. 14 and 15, where the casting SDK receives and parses the return instruction to determine whether the casting information page is currently displayed. Based on that the casting information page is currently displayed, step S1303 can be executed. Based on that the casting information page is not currently displayed, the casting SDK responds to the return instruction. In this case, the return instruction is only passed upward when it is determined that the display is currently showing the casting information page; otherwise, the return instruction is processed internally within the casting function.

The upward passing of the return instruction mainly involves the casting SDK, the startup service in the system library layer, and the casting application in the application layer. The difference between FIGS. 14 and 15 lies in the processing method after the return instruction is transmitted to the casting application. However, the interaction process among the front-end casting SDK, the startup service, and the casting application are the same in the two methods shown in FIGS. 14 and 15. Here, the processing flow for the return instruction at the front end is introduced first.

Specifically, the casting SDK can be invoked to send the return instruction to the casting application using a broadcast method so that the casting application can respond to the return instruction and control the display to switch to the specified page.

In the Android system, the casting SDK in the kernel layer cannot directly communicate with the application layer, but relies on components in the intermediate layer. Thus, the casting SDK needs to first forward the received return instruction to the startup service in the system library layer, and then the startup service can be called to broadcast the return instruction to send it to the casting application in the application layer. This allows the casting application to respond to the return instruction and the display apparatus to switch to the specified page.

In some embodiments, the startup service can listen to socket connections, and the casting SDK can forward the return instruction to the startup service via a socket. A socket is one endpoint of a two way communication link between different application processes running on the network, and it can be understood as one end of inter-process communication. During communication, the casting SDK writes the return instruction into the socket corresponding to the underlying driver and then sends the return instruction to the socket corresponding to the startup service through the transmission medium between the casting SDK and the startup service. The startup service reads the return instruction from its corresponding socket. This socket-based data transmission provides higher communication efficiency between components, thereby improving the processing speed of the display apparatus.

It can be understood that the casting SDK can also send the return instruction to the startup service using other methods, such as broadcasting or using Binder. Broadcasting is simpler to implement, while the Binder method generally offers better performance and responsiveness. The method for transmitting the return instruction from the casting SDK to the startup service can be flexibly configured based on requirements.

Next, the process by the casting application in response to the return instruction response in the embodiments shown in FIGS. 14 and 15 will be described.

For implementation method (1) shown in FIG. 14, the intent component and the Android launcher component are required. In practice, step 1401 for the casting SDK is executed, then proceeds to step 1402 for the startup service via socket communication. After the service starts, step 1403 is executed by the casting application by broadcasting. Finally, step 1404 for the desktop startup component is executed via invoking the intent component.

In the embodiment shown in FIG. 14, for the implementation method (1), regardless of whether entering casting after entering the source page via the source entrance, from the Android system desktop, HDMI, or other signal source channels, or from the relevant page of an application installed on the display apparatus, upon receiving the return instruction, the display apparatus will switch to the Android system desktop. Switching to the operating system's desktop requires restarting the desktop startup component.

Specifically, the casting application responds to the return instruction, terminating the operation of the casting application. The activity manager pops the task corresponding to the casting application from the top of the stack and controls the closing of the window corresponding to the casting application, thereby closing the casting information page. Furthermore, based on the intent component, descriptive data for the return instruction can be generated, allowing the Android system to determine that the component to be invoked is the Android desktop startup component, which is then called to restart, and the operating system's desktop can be displayed. This service logic can meet user habits, solves the issue of the display apparatus not responding to return instructions on the casting information page, and is relatively simple in implementation complexity.

For implementation method (2), as shown in FIG. 15, the activity manager, target application (the data source object that is active before entering the casting information page), intent component, and the Android desktop startup component are required.

In the embodiment shown in FIG. 15, for implementation method (2), switching to different pages based on different pre-casting channels is more targeted, aligning with the business logic of "returning from where you came" and user habits, thus providing a better user experience. In practice, the steps prior to the execution of step 1404 for the casting application are the same as those in FIG. 14 and will not be repeated here. In step 1404 after the step for casting application, the custom parameter value is obtained based on the received return instruction.

Step 1501: based on that the custom parameter equals the preset value, calling the desktop startup component through the intent component to return to the operating system's desktop.

Step 1502: based on that the custom parameter does not equal the preset value, calling the target application through the activity manager to switch to the homepage of the target application.

Specifically, after receiving the return instruction, the casting application can obtain the value of the custom parameter, which will determine whether to return to the operating system's desktop or to the homepage of the target application based on that value.

The custom parameter indicates whether the data source object that is active before entering the casting information page belongs to a signal source supported by the display apparatus or is an application installed on the display apparatus. Assuming the custom parameter is "launch source", any signal source corresponds to the same value of "launch source", while different applications can correspond to either the same or different values of "launch source", which is not limited here in the disclosure. For example, taking the values of "launch source" are the same for any signal source, the casting application determining that the value of "launch source" equals the preset value indicates that the display apparatus entered casting under a signal source. Determining that the value of "launch source" does not equal the preset value indicates that the display apparatus entered casting under an application. If the value of "launch source" equals the preset value, it is determined that the Android system's desktop is required to be switched to; if the value of "launch source" does not equal the preset value, it is determined that the homepage of the application is required to be switched to.

In the disclosure, the value of the preset value is not limited. For example, the preset value can be 1, 0, or any other number. Additionally, the "launch source" can be updated by the activity manager based on the tasks of the applications that are in the active state. The casting application always needs to obtain the latest values of "launch source" from the activity manager after receiving the return instruction.

In the embodiment shown in FIG. 15, the specific processing flow after determining to return to the Android system's desktop is consistent with the processing flow shown in FIG. 14, which can be referenced for description. For brevity, it will not be repeated here.

If it is determined that the homepage of the application is needed to be switched to, in response to the return instruction, terminating the casting application. The activity manager pops the task corresponding to the casting application from the top of the stack and controls the closing of the window corresponding to the casting application, thereby closing the casting information page. Then, the activity manager can push the task corresponding to the target application, which is to be restored to the active state, to the top of the stack for getting focus, thereby restarting the task corresponding to the target application, displaying the window corresponding to the target application and presenting the homepage of the target application in the window.

Figure 16:
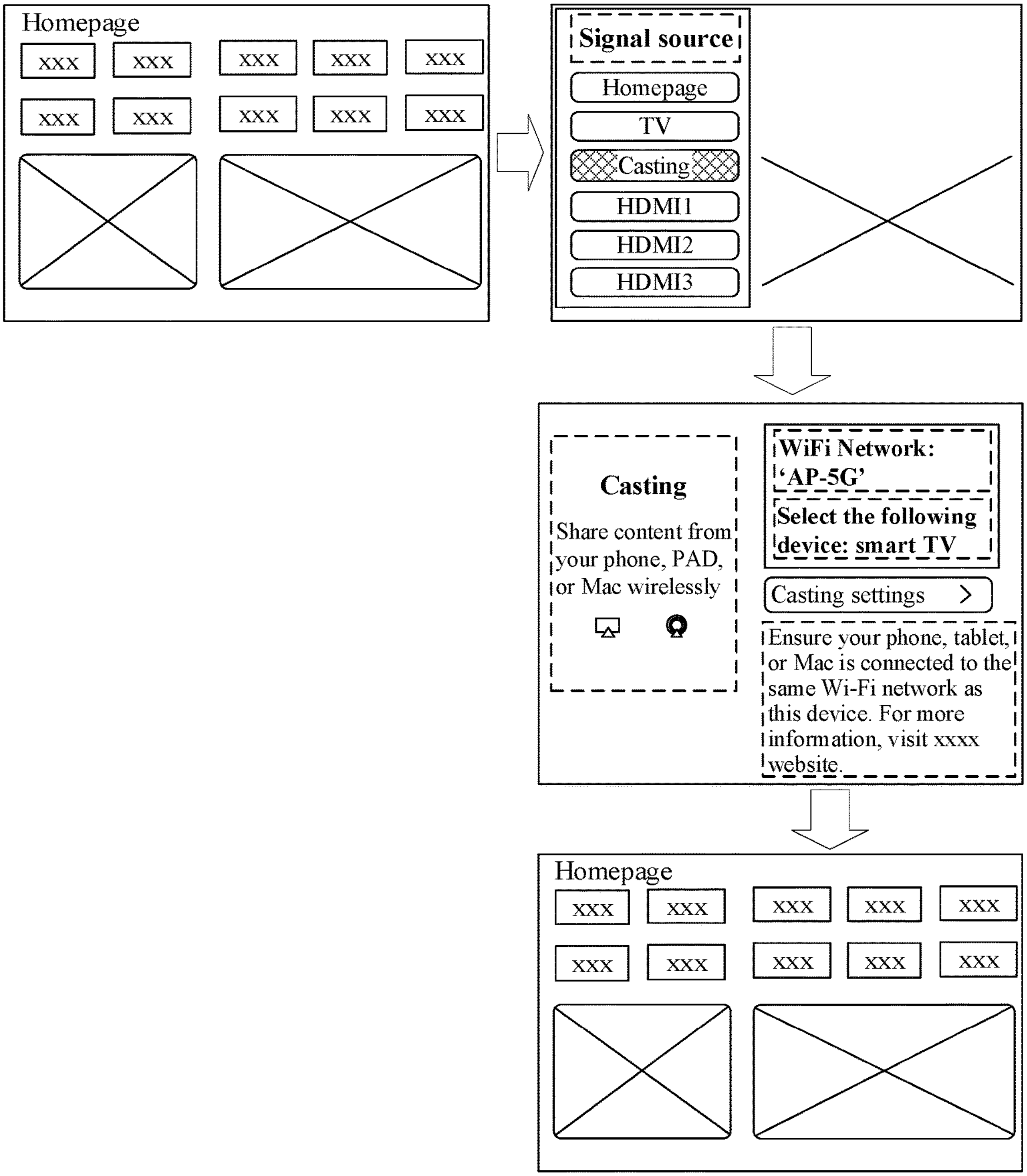
FIG. 16 shows a schematic diagram illustrating page switching of a display apparatus according to some embodiments.
Figure 17:
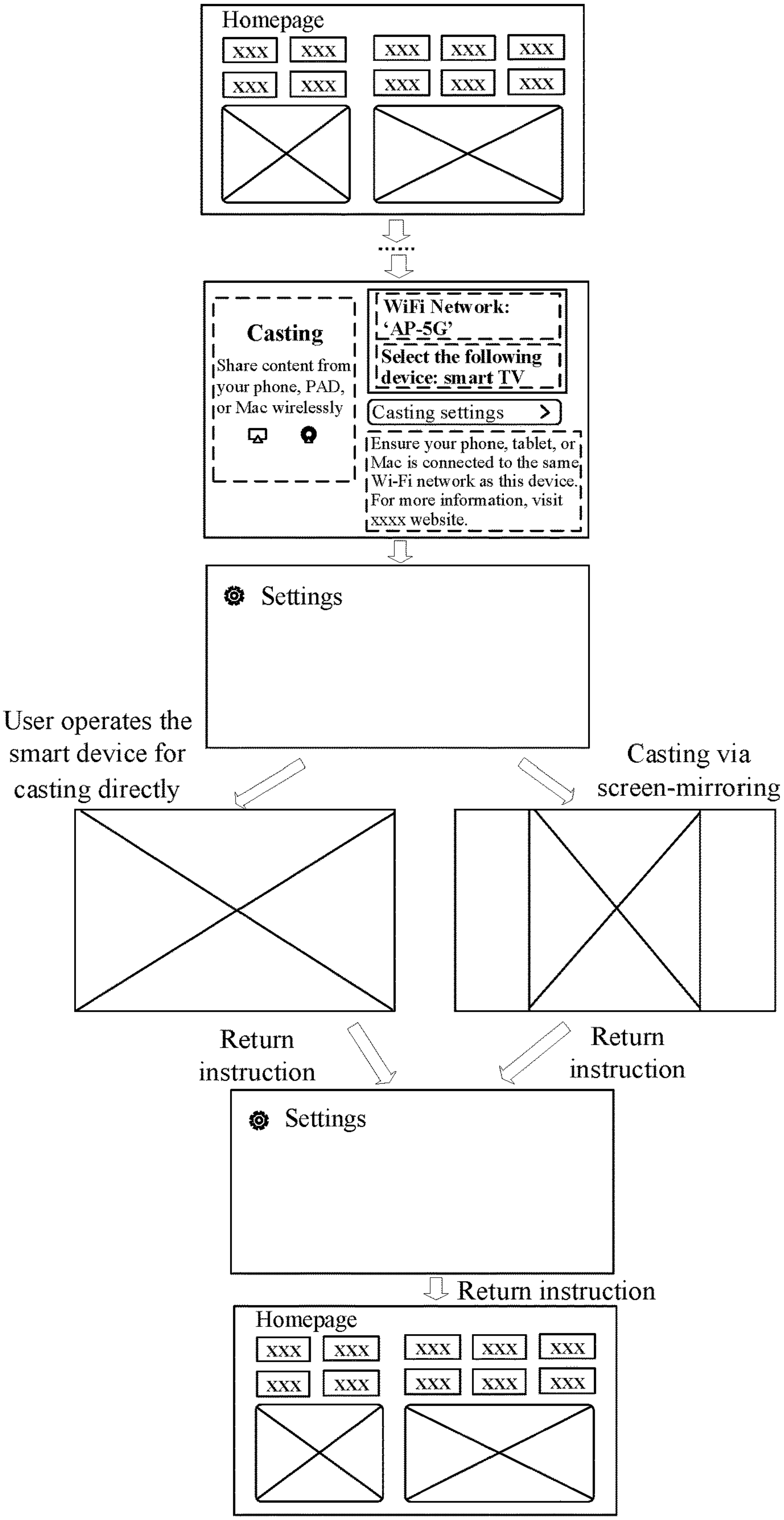
FIG. 17 shows a schematic diagram illustrating page switching of a display apparatus according to some embodiments.
Figure 18:
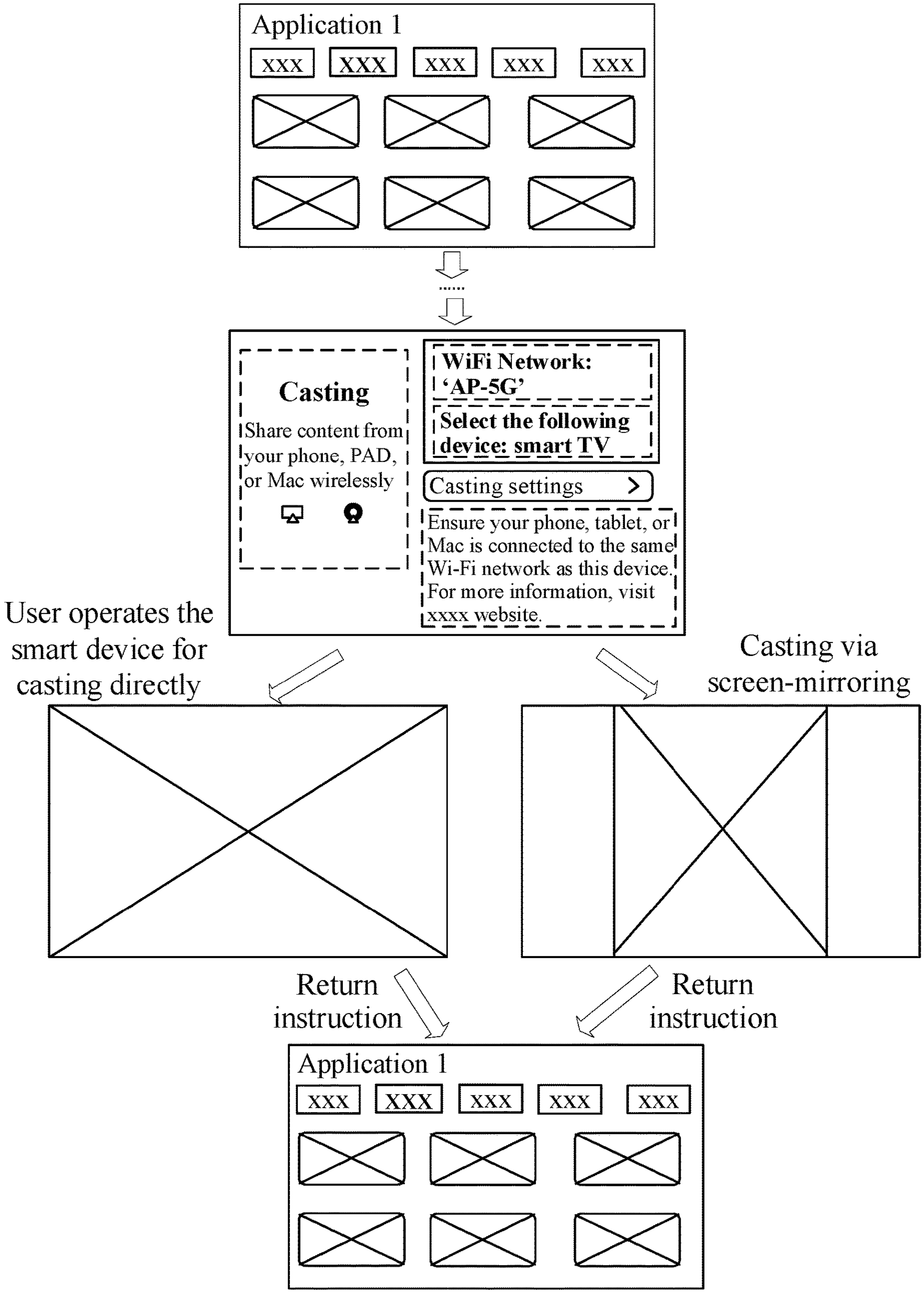
FIG. 18 shows a schematic diagram illustrating page switching of a display apparatus according to some embodiments.

Next, the embodiments shown in FIGS. 16 to 18 illustrate the changes in the user interface of the display apparatus when employing the aforementioned two different implementation methods.

Refer to FIG. 16, according to the sequence of interface changing indicated by the arrows, the display apparatus responds to user operations on the remote control's signal source button, generating an instruction for displaying the signal source page on the Android system's desktop. Then, the user selects casting as the signal source from multiple source options to activate the casting function, and the display apparatus switches to the casting information page shown in the middle. Afterwards, upon receiving a return instruction generated based on the user pressing the return button on the remote control, the display apparatus switches from the casting information page to the Android system's desktop.

Refer to FIG. 17, according to the sequence of interface changing indicated by the arrows, the display apparatus responds to the user's selection of the signal source button on the remote control, generating an instruction for displaying the signal source page on the Android system's desktop. The user then selects casting as the signal source from multiple source options, activating the casting function, and the display apparatus switches to the casting information page. The casting settings page can be accessed through the entry in the casting information page. A connection with the display apparatus can be established using screen mirroring or directly via a casting button in the multimedia content playback page of the application on the mobile device, and a casting content presenting page can be shown on the display apparatus. During the casting content display, the display apparatus can receive a return instruction generated based on the user's selection of the return button on the remote control, and switch from the casting content presenting page to the casting information page. Afterwards, upon receiving another return instruction generated based on the user's selection of the return button on the remote control, the display apparatus switches from the casting information page to the Android system's desktop.

Refer to FIG. 18, according to the sequence of interface changing indicated by the arrows, first the display apparatus is showing the homepage of application 1 installed on it. After that, the display apparatus responds to the user's selection of the signal source button on the remote control, generating an instruction for displaying the signal source page on the homepage of application 1. The user then selects casting as the signal source from multiple source options, activating the casting function, and the display apparatus switches to the casting information page. A connection with the display apparatus can be established through the casting button in the multimedia content playback page of the application on the mobile device or by screen mirroring, and the casting content can be displayed on the display apparatus. During the casting content display, the display apparatus can receive a return instruction generated based on the user's selection of the return button on the remote control, and switch from the casting content presenting page to the casting information page. Subsequently, upon receiving another return instruction generated based on the user's selection of the return button on the remote control, the display apparatus switches from the casting information page to the homepage of application 1.

As shown in FIGS. 17 and 18, the first return instruction received by the display apparatus is processed internally by the casting SDK, while the second return instruction is uploaded by the casting SDK to the casting application for processing via the startup service.

Combining the embodiments shown in FIGS. 16 to 18, by adopting the control method for the display apparatus according to embodiments of the disclosure, the display apparatus can respond to return instructions on the casting information page using a unified strategy or a flexible and targeted strategy, controlling page transitions to meet user habits and improving the user experience when using the casting function on the display apparatus.

The normal use of the casting function relies on the MFI key (Made for iphone/ipod/iPad, primarily used for the legitimacy verification of Apple devices) and the FairPlay Key (used to decrypt multimedia content protected by FairPlay digital rights management).

To ensure the security of service credentials, the currently widely used method for writing service credentials is to write them into the display apparatus during production. However, on one hand, writing service credentials to related devices during production causes the production schedule to depend on the certification progress of the service credentials. If the display apparatus does not pass the certification of the business party, it cannot obtain the service credentials, which in turn affects the production schedule of the display apparatus. On the other hand, writing service credentials to related devices during production also leads to the fact that once the service credentials are written to the display apparatus and delivered to the user, they cannot be changed. When the service credentials are abnormal or need to be updated, it becomes impossible to rewrite the service credentials in the display apparatus.

Based on this, in embodiments of the disclosure, a first device signature can be generated according to a first encryption key written to the display apparatus, then a credential acquisition request carrying the first device signature can be sent to a server, the service credential can be received from the server, and the service credential can be written to a preset storage location in the display apparatus. On one hand, since in the embodiments of the disclosure, the service credential is obtained from the server and written to the preset storage location of the display apparatus, it allows for writing the service credential to the display apparatus at any stage, rather than being limited to the production stage. On the other hand, because the credential acquisition request carries the first device signature of the display apparatus generated based on the first encryption key written to the display apparatus, and the server will only send the corresponding service credential to the display apparatus if it determines that the display apparatus's authentication is successful based on the first device signature, preventing unauthorized devices from stealing the service credential of the display apparatus from the server, thus ensuring the security of the service credential.

Therefore, based on the process, the issues caused by writing service credentials to the display apparatus during production, such as affecting production progress and the inability to rewrite credentials, can be alleviated.

Continuing with the scenario shown in FIG. 1, the scene architecture of the service credential writing method is illustrated. As shown in FIG. 1, the scene architecture according to some embodiments can include a control device 100, a display apparatus 200, a smart device 300, and a server 400.

Users can operate the display apparatus 200 via the smart device 300 or the control device 100 to control the display apparatus 200 to perform corresponding operations. A data communication link is established between the display apparatus 200 and the server 400, and the server 400 stores the service credential corresponding to the display apparatus 200. The display apparatus 200 can send a credential acquisition request to the server 400 to obtain the service credential and write the service credential to a specified storage location, thereby completing the writing of the service credential. Upon receiving the credential acquisition request from the display apparatus, the server 400 will first authenticate the display apparatus and will only return the service credential to the display apparatus if the authentication is successful.

The display apparatus 200 according to some embodiments can take various forms, such as a television, smart speaker with display, smart refrigerator with display, personal computer (PC), laser projector, monitor, electronic bulletin board, wearable device, in-vehicle device, electronic table, etc. The server 400 according to some embodiments can also take various forms, such as a cloud server or a content delivery network (CDN). The server 400 can be a single cluster or multiple clusters, and may include one or more types of servers.

In some embodiments, a first encryption key is written to the display apparatus 200, and a service credential corresponding to the display apparatus 200 and a first decryption key corresponding to the first encryption key are uploaded to the server 400. When writing the service credential is needed, the display apparatus 200 can read the written first encryption key through the processor 250, generate the first device signature based on the first encryption key, and then send a credential acquisition request carrying the first device signature to the server 400 via the processor 220. The server 400 authenticates the display apparatus 200 based on the first decryption key and the first device signature. Based on that authentication for the display apparatus 200 passes, the server 400 can send the service credential corresponding to the display apparatus 200 to the display apparatus 200. After receiving the service credential sent from the server 400, the display apparatus 200 can save the service credential to a preset storage location, thereby completing the writing of the service credential. Since the server 400 will only send the service credential to the display apparatus 200 if it has confirmed that the authentication for the display apparatus 200 passes in the embodiments, unauthorized devices can be prevented from stealing the service credential of the display apparatus 200 from the server 400, thus ensuring the security of the service credential.

In some embodiments, the method for the display apparatus 200 to generate the first device signature based on the first encryption key written to the display apparatus can include: the processor 250 of the display apparatus 200 encrypting a first file using the first encryption key to obtain a first encrypted file; obtaining abstract information of the first file based on a preset algorithm; and generating the first device signature based on the first encrypted file and the abstract information. Correspondingly, the method for the server 400 to authenticate the display apparatus 200 based on the first device signature can include: the server 400 parsing the first device signature to obtain the first encrypted file and the abstract information of the first file, decrypting the first encrypted file using the first decryption key corresponding to the first encryption key to obtain decrypted data of the first encrypted file, obtaining the abstract information of the decrypted data based on the preset algorithm, comparing whether the abstract information of the decrypted data of the first encrypted file is same as the abstract information carried in the credential acquisition request, based on the abstract information of the decrypted data of the first encrypted file is same as the abstract information carried in the credential acquisition request, determining that the display apparatus 200 has passed authentication, and based on that the abstract information of the decrypted data of the first encrypted file is not same as the abstract information carried in the credential acquisition request, determining that the display apparatus failed the authentication.

In some embodiments, to ensure the validity of the first encryption key written to the display apparatus 200, after writing the first encryption key to the display apparatus 200, the processor 250 of the display apparatus 200 can generate a second device signature based on the first encryption key. The communicating device 220 of the display apparatus 200 can send an authentication request carrying the second device signature to the server 400 and receive an authentication response sent from the server 400. The processor 250 of the display apparatus 200 can determine that the first encryption key is valid based on that the authentication response indicates that the display apparatus has passed authentication, and determine that the first encryption key is invalid based on that the authentication response indicates that the display apparatus has failed authentication. Correspondingly, after the server 400 receives the authentication request sent by the display apparatus 200, it will authenticate the display apparatus 200 based on the second device signature carried in the authentication request and return an authentication result to the display apparatus 200. In the embodiments, the validity of the first encryption key can be verified after written to the display apparatus 200, thereby preventing the scenario where the display apparatus 200 cannot obtain service credentials from the server 400 due to an invalid first encryption key, thus enhancing the reliability of writing service credentials to the display apparatus.

In some embodiments, a second encryption key is also uploaded to the server 400, and the display apparatus 200 is also written with a second decryption key corresponding to the second encryption key. The implementation for the server 400 to send the service credential to the display apparatus 200 can include: the server 400 sending a second encrypted file, which is obtained by encrypting the service credential using the second encryption key, to the display apparatus 200. After receiving the second encrypted file, the display apparatus 200 can obtain the second decryption key written to the display apparatus and decrypts the second encrypted file using the second decryption key to obtain the service credential. One way the server 400 can obtain the second encrypted file can be: uploading both the second encryption key and the service credential to the server 400, the server 400 encrypting the service credential using the second encryption key to obtain the second encrypted file. Another way for the server 400 to obtain the second encrypted file can be: directly uploading the second encrypted file, which is obtained by encrypting the service credential with the second encryption key, to the server 400.

In some embodiments, to ensure the validity of the second decryption key written to the display apparatus 200, the communicating device 220 of the display apparatus 200 can obtain a third encrypted file, which is obtained by encrypting a preset file with the second encryption key, from the server 400 after the second decryption key is written to the display apparatus 200. The processor 250 of the display apparatus 200 can decrypt the third encrypted file using the second decryption key to obtain the decrypted data, and then compare whether the decrypted data matches the preset file. Based on that the decrypted data matches the preset file, the second decryption key is confirmed to be valid; based on that the decrypted data does not match the preset file, the second decryption key is confirmed to be invalid. In the embodiment, after the second decryption key is written to the display apparatus 200, the validity of the second decryption key is verified, thus preventing the issue where an invalid second decryption key leads to the display apparatus 200 being unable to decrypt the encrypted service credential, thereby enhancing the reliability of writing service credentials to the display apparatus.

In some embodiments, to prevent the second decryption key from being stolen during the writing process, the implementation for writing the second decryption key to the display apparatus 200 can include: the memory of the display apparatus 200 receiving a fourth encrypted file, which is obtained by encrypting the second decryption key with a third encryption key. The processor of the display apparatus 200 can decrypt the fourth encrypted file using a third decryption key pre-installed in the software system of the display apparatus to obtain the second decryption key. The third decryption key is the decryption key corresponding to the third encryption key. Since the second decryption key is encrypted during the writing process, personnel or devices involved in the writing can only obtain the fourth encrypted file obtained by encrypting the second decryption key with the third encryption key and cannot access the decrypted second decryption key, thus preventing the second decryption key from being stolen during the writing process.

In some embodiments, to prevent the first encryption key from being stolen during the writing process, the implementation for writing the first encryption key to the display apparatus 200 can include: the memory of the display apparatus 200 receiving a fifth encrypted file, which is obtained by encrypting the first encryption key with the third encryption key. The processor of the display apparatus 200 can decrypt the fifth encrypted file using the third decryption key pre-installed in the software system of the display apparatus to obtain the first decryption key. The third decryption key is the decryption key corresponding to the third encryption key. Since the first encryption key is encrypted during the writing process, personnel or devices involved in the writing can only access the fifth encrypted file obtained by encrypting the first encryption key based on the third encryption key and cannot obtain the decrypted first encryption key, thus preventing the theft of the first encryption key during the writing process.

Figure 19:
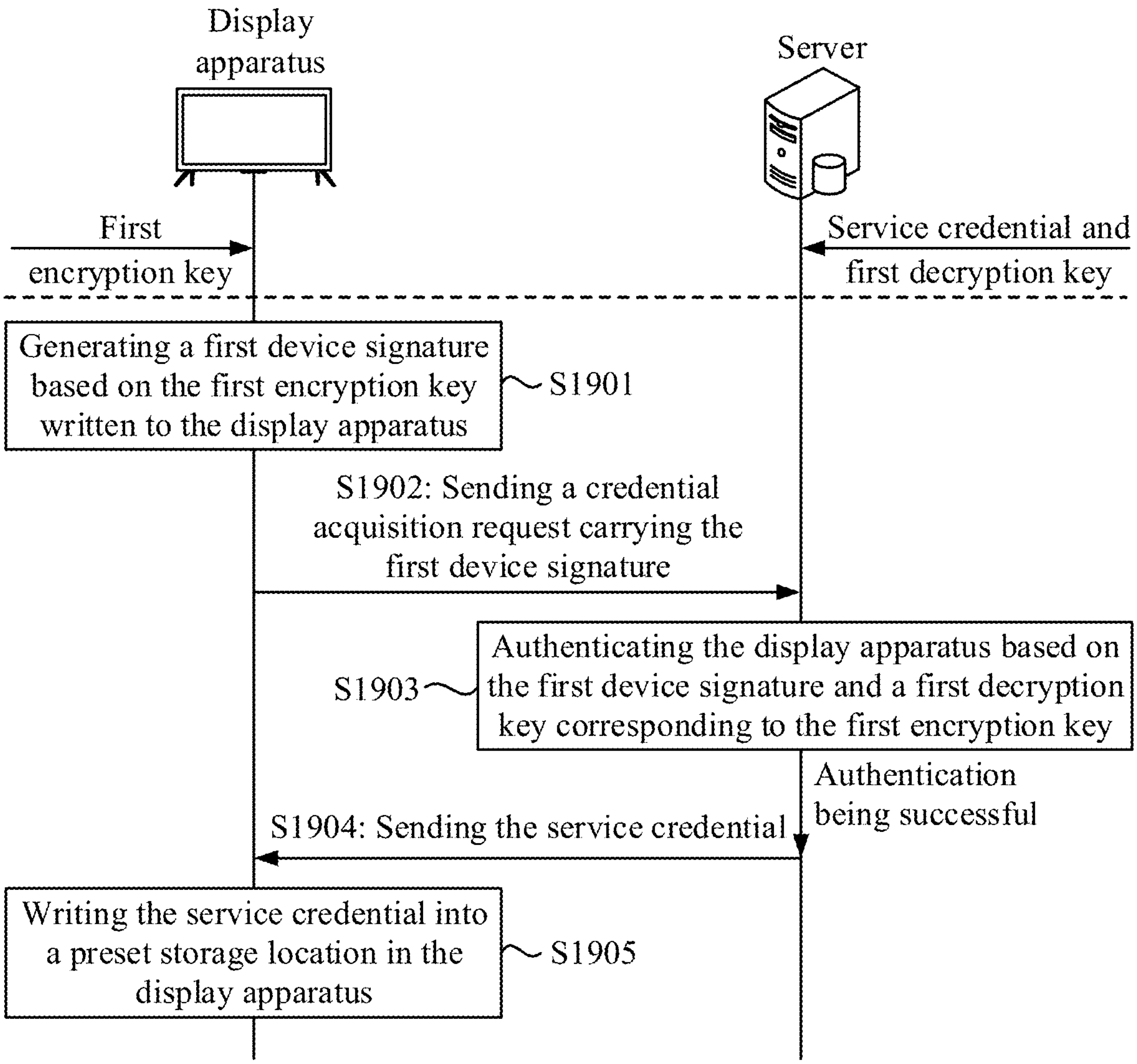
FIG. 19 shows an interaction flowchart of a method for writing a service credential according to some embodiments.

The interaction flowchart of the service credential writing method as shown in FIG. 19 illustrates an implementation according to embodiments of the disclosure and includes the following steps.

S1901: the display apparatus generates a first device signature based on a first encryption key written to the display apparatus.

In some embodiments, the first encryption key can be written to the display apparatus during production. That is, the first encryption key is written to the display apparatus during production, and when the display apparatus needs to obtain the service credential, it reads the first encryption key written during production and generates the first device signature based on the first encryption key.

In the embodiments of the disclosure, the first encryption key is used to authenticate the display apparatus, so the first encryption key corresponds in a one-to-one manner to each display apparatus, and each display apparatus has a unique first encryption key.

S1902: the display apparatus sends a credential acquisition request carrying the first device signature to the server.

Correspondingly, the server receives the credential acquisition request carrying the first device signature sent from the display apparatus.

The credential acquisition request is used to ask the server to return a service credential corresponding to the display apparatus after determining that the display apparatus has passed authentication based on the first device signature.

In some embodiments, the credential acquisition request can be a registration request sent to the server when the display apparatus is first connected to the network. Once completing the authentication of the display apparatus, the server can send the corresponding service credential to the display apparatus.

The service credential in embodiments of the disclosure can include, but not limited to, MFI keys, FairPlay keys, etc.

S1903: the server authenticates the display apparatus based on the first device signature and a first decryption key corresponding to the first encryption key.

In the embodiments of the disclosure, the first encryption key and the first decryption key are a one-to-one relationship, with each display apparatus having a unique first encryption key.

In some embodiments, the first encryption key and the first decryption key can be keys in a symmetric encryption algorithm, meaning they are the same.

In some embodiments, the first encryption key and the first decryption key can be key pairs in an asymmetric encryption algorithm, where the first encryption key is a public key and the first decryption key is a private key in that algorithm.

In S1903, based on that the server determines that the authentication of the display apparatus fails based on the first device signature and the first decryption key corresponding to the first encryption key, the server can determine that the display apparatus does not have a permission to obtain the service credential and can therefore refuse to send the service credential to the display apparatus. Based on that the server determines that the authentication of the display apparatus has passed based on the first device signature and the first decryption key corresponding to the first encryption key, then the server can confirm that the display apparatus has the permission to obtain the service credential, leading to the execution of the following step S1904.

S1904: the server sends the service credential to the display apparatus.

Correspondingly, the display apparatus receives the service credential sent from the server.

S1905: the display apparatus writes the service credential into a preset storage location in the display apparatus.

In some embodiments, the preset storage location may be a storage location within the Trusted Execution Environment (TEE) of the display apparatus.

Storing the service credential in a storage location within the Trusted Execution Environment can prevent the service credential from being stolen from the display apparatus during the writing process, thereby further enhancing the security of the service credential.

Based on the display apparatus and the service credential writing method according to some embodiments, the first device signature can be generated based on the first encryption key written to the display apparatus, then a credential acquisition request carrying the first device signature can be sent to the server, the service credential can be received from the server, and can be then written into the preset storage location within the display apparatus. On one hand, since in the method according to embodiments of the disclosure, the service credential is obtained from the server and written to the preset storage location in the display apparatus, it allows the service credential to be written to the display apparatus at any stage, not limited to the production stage. On the other hand, because the credential acquisition request carries the first device signature generated based on the first encryption key written to the display apparatus, and the server can only send the corresponding service credential to the display apparatus if it determines that the authentication of the display apparatus is successful based on the first device signature, illegal devices can be prevented from stealing the service credential of the display apparatus from the server, thus ensuring the security of the service credential. In summary, in embodiments of the disclosure, the secure writing of service credentials to the display apparatus after it has been delivered can be allowed, addressing issues caused by writing service credentials to the display apparatus during production, such as affecting production progress and the inability to rewrite credentials.

Figure 20:
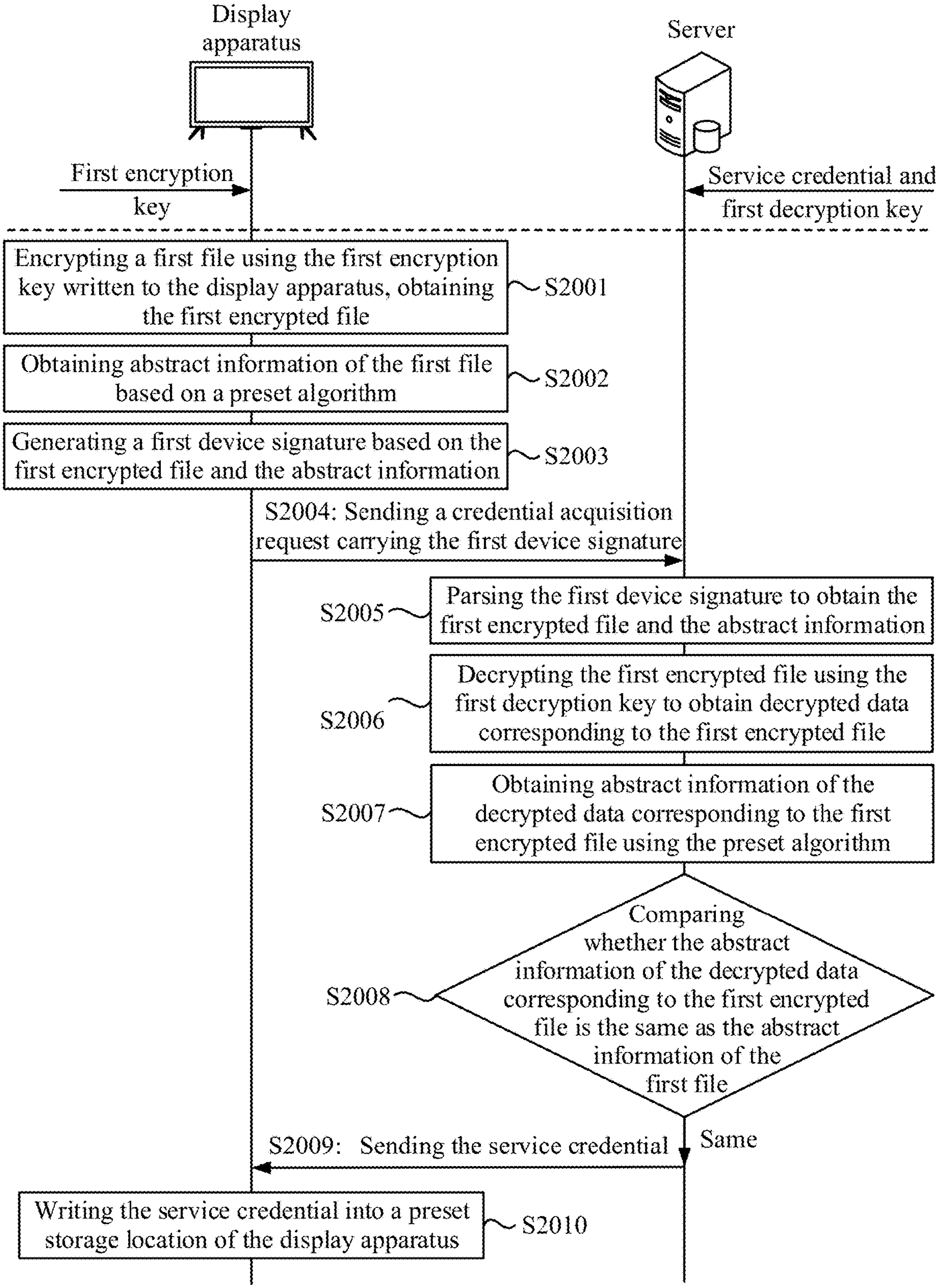
FIG. 20 shows an interaction flowchart of a method for writing a service credential according to some embodiments.

As an extension and refinement of the embodiment shown in FIG. 19, embodiments of the disclosure provide another method for writing a service credential, as illustrated in FIG. 20. The interaction flowchart of the method for writing the service credential includes the following steps. S2001: the display apparatus encrypts a first file using the first encryption key written to the display apparatus, obtaining the first encrypted file.

The first file in the embodiments of the disclosure can be any file.

In some embodiments, the display apparatus can randomly generate a text file containing multiple characters as the first file.

S2002: the display apparatus obtains abstract information of the first file based on a preset algorithm.

In some embodiments, S2002 (obtaining the abstract information of the first file based on a preset algorithm) may include: performing a hash calculation on the first file using a hash algorithm, and taking a hash value obtained from the hash calculation as the summary information of the first file.

For example, a hash calculation can be performed on the first file using the SHA256 algorithm (a hash algorithm with a hash value length of 256 bits), and the resulting hash value can serve as the abstract information of the first file.

S2003: the display apparatus generates a first device signature based on the first encrypted file and the abstract information.

In some embodiments, the first encrypted file and the abstract information can be directly encapsulated in a single data packet, and the resulting data packet can be used as the first device signature.

S2004: the display apparatus sends a credential acquisition request carrying the first device signature to the server.

Correspondingly, the server receives the credential acquisition request carrying the first device signature sent by the display apparatus.

The credential acquisition request is used to ask the server to return a service credential corresponding to the display apparatus based on determining that the authentication for the display apparatus has passed based on the first device signature.

S2005: the server parses the first device signature to obtain the first encrypted file and the abstract information.

S2006: the server decrypts the first encrypted file using the first decryption key to obtain decrypted data corresponding to the first encrypted file.

S2007: the server obtains abstract information of the decrypted data corresponding to the first encrypted file using the preset algorithm.

It should be noted that the algorithm used by the server to obtain the abstract information of the decrypted data corresponding to the first encrypted file is the same as the algorithm used by the display apparatus to obtain the abstract information of the first file.

S2008: the server compares whether the abstract information of the decrypted data corresponding to the first encrypted file is the same as the abstract information of the first file.

When the display apparatus is a legitimate device, since the encryption key (first encryption key) used to generate the first encrypted file and the decryption key (first decryption key) used to decrypt the first encrypted file are a key pair, the decrypted data obtained by the server should be the first file. Because the algorithms used by the display apparatus and the server to obtain the abstract information are the same, the obtained abstract information should also be identical. When the display apparatus is an illegal device, the encryption key (first encryption key) used to generate the first encrypted file and the decryption key (first decryption key) used to decrypt the first encrypted file cannot form a key pair, thus the decrypted data obtained by the server cannot be same as the first file, leading to differences in the abstract information between the decrypted data and the first file. Therefore, in the embodiments of the disclosure, whether the authentication of the display apparatus is successful can be determined based on whether the abstract information of the decrypted data corresponding to the first encrypted file is same as the abstract information of the first file.

In step S2008 above, if the abstract information of the decrypted data corresponding to the first encrypted file differs from the abstract information of the first file, it can be determined that the authentication for the display apparatus has failed, and the service credential cannot be sent to the display apparatus. If the abstract information of the decrypted data corresponding to the first encrypted file is the same as the abstract information of the first file, it can be determined that the authentication for display apparatus is successful, and the following subsequent steps will be executed.

S2009: the server sends the service credential to the display apparatus.

Correspondingly, the display apparatus receives the service credential sent from the server.

S2010: the display apparatus writes the service credential into a preset storage location of the display apparatus.

Figure 21:
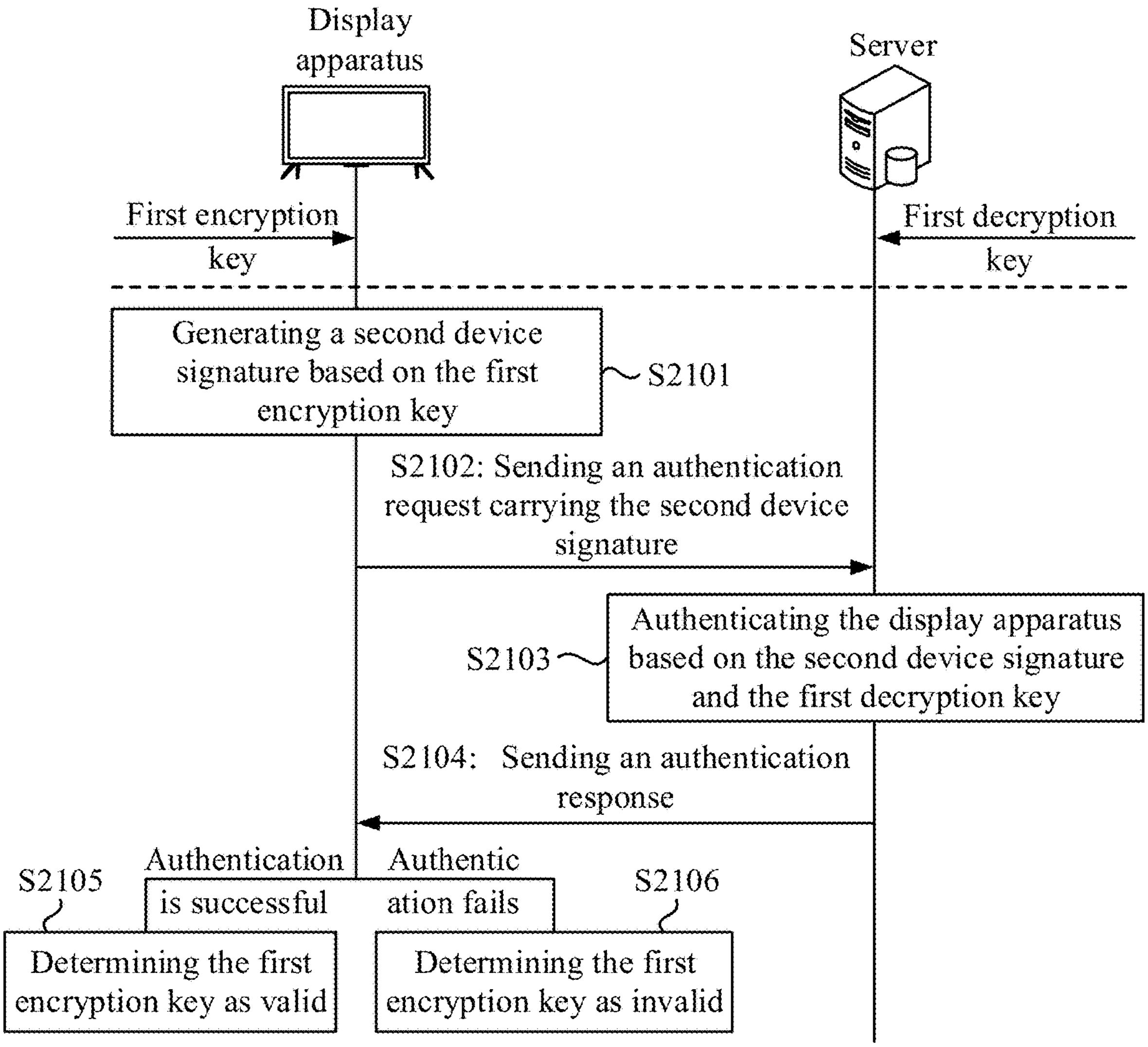
FIG. 21 shows an interaction flowchart of a method for writing a service credential according to some embodiments.

The first encryption key written to the display apparatus may be invalid due to reasons such as not corresponding to the first decryption key, leading to that the display apparatus cannot obtain the service credential from the server. To ensure the validity of the first encryption key written to the display apparatus, the method for writing the service credential according to some embodiments can further include verifying the validity of the first encryption key written to the display apparatus after it has been written. Referring to FIG. 21, the process for verifying the validity of the first encryption key written to the display apparatus can include the following steps.

S2101: the display apparatus generates a second device signature based on the first encryption key.

In some embodiments, the implementation method for generating the second device signature based on the first encryption key can be the same as that of the display apparatus generating the first device signature based on the first encryption key.

In some embodiments, the implementation method for generating the second device signature based on the first encryption key can be: encrypting a specified file with the first encryption key to obtain the second device signature.

S2102: the display apparatus sends an authentication request carrying the second device signature to the server.

Correspondingly, the server receives the authentication request carrying the second device signature sent from the display apparatus.

The authentication request is used to request the server to authenticate the display apparatus based on the second device signature.

S2103: the server authenticates the display apparatus based on the second device signature and the first decryption key.

In some embodiments, the implementation method for generating the second device signature based on the first encryption key can be the same as that of the display apparatus generating the first device signature based on the first encryption key. In this case, the implementation method for authenticating the display apparatus by the server based on the second device signature and the first decryption key corresponding to the first encryption key is the same as the implementation method for authenticating the display apparatus based on the first device signature and the first decryption key corresponding to the first encryption key.

In some embodiments, the implementation method for generating the second device signature based on the first encryption key can include: encrypting a specified file with the first encryption key to obtain the second device signature. In this case, the implementation method for authenticating the display apparatus by the server based on the second device signature and the first decryption key corresponding to the first encryption key can be: decrypting the second encrypted file with the first decryption key, obtaining decrypted data corresponding to the second encrypted file, and determining whether the authentication of the display apparatus is successful based on whether the decrypted data corresponding to the second encrypted file is the same as the specified file.

S2104: the server sends an authentication response to the display apparatus.

Correspondingly, the display apparatus receives the authentication response sent from the server.

The authentication response is used to indicate whether the authentication of the display apparatus is successful or fails.

If the authentication response indicates that the display apparatus authentication is successful, then step S2105 is executed; if the authentication response indicates that the display apparatus authentication fails, then step S2106 is executed.

S2105: the first encryption key is determined as valid.

S2106: the first encryption key is determined as invalid.

In the above embodiments, after writing the first encryption key to the display apparatus, the validity of the first encryption key can be further verified, so that situations where the display apparatus is unable to obtain the service credential from the server due to the first encryption key being invalid can be avoided.

In some embodiments, the method for triggering the validity check of the first encryption key can be: executing the process for verifying the validity of the first encryption key as shown in FIG. 21 in response to an operation from the user.

For example, when the user selects a hidden entry in the display apparatus, such as Settings—Sound—Advanced Settings, and presses button "2022" on the remote control, the Outgoing Quality Control (OQC) application is opened. The user selects a target virtual button in the application interface, and the process for verifying the validity of the first encryption key as shown in FIG. 21 can be executed.

In the process of the server sending the service credential to the display apparatus, the service credential may be intercepted, and further leading to theft. To ensure the security of the process in which the server sends the service credential to the display apparatus, referring to FIG. 22, based on the embodiment shown in FIG. 19, the implementation of step S1904 (the server sends the service credential to the display apparatus) may include the following.

**S1904*a***: the server sends a second encrypted file to the display apparatus.

Correspondingly, the display apparatus receives the second encrypted file sent from the server.

The second encrypted file is an encrypted file obtained by encrypting the service credential based on a second encryption key.

In some embodiments, the method for the server to obtain the second encrypted file may include: the server receiving the uploaded service credential and the second encryption key, and encrypting the service credential based on the second encryption key to obtain the second encrypted file.

That is, the service credential and the second encryption key are written to the server, and then the server generates the second encrypted file by encrypting the service credential based on the second encryption key.

In some embodiments, the method for the server to obtain the second encrypted file may include: the server receiving the uploaded second encrypted file.

That is, the second encrypted file is directly written to the server.

Figure 22:
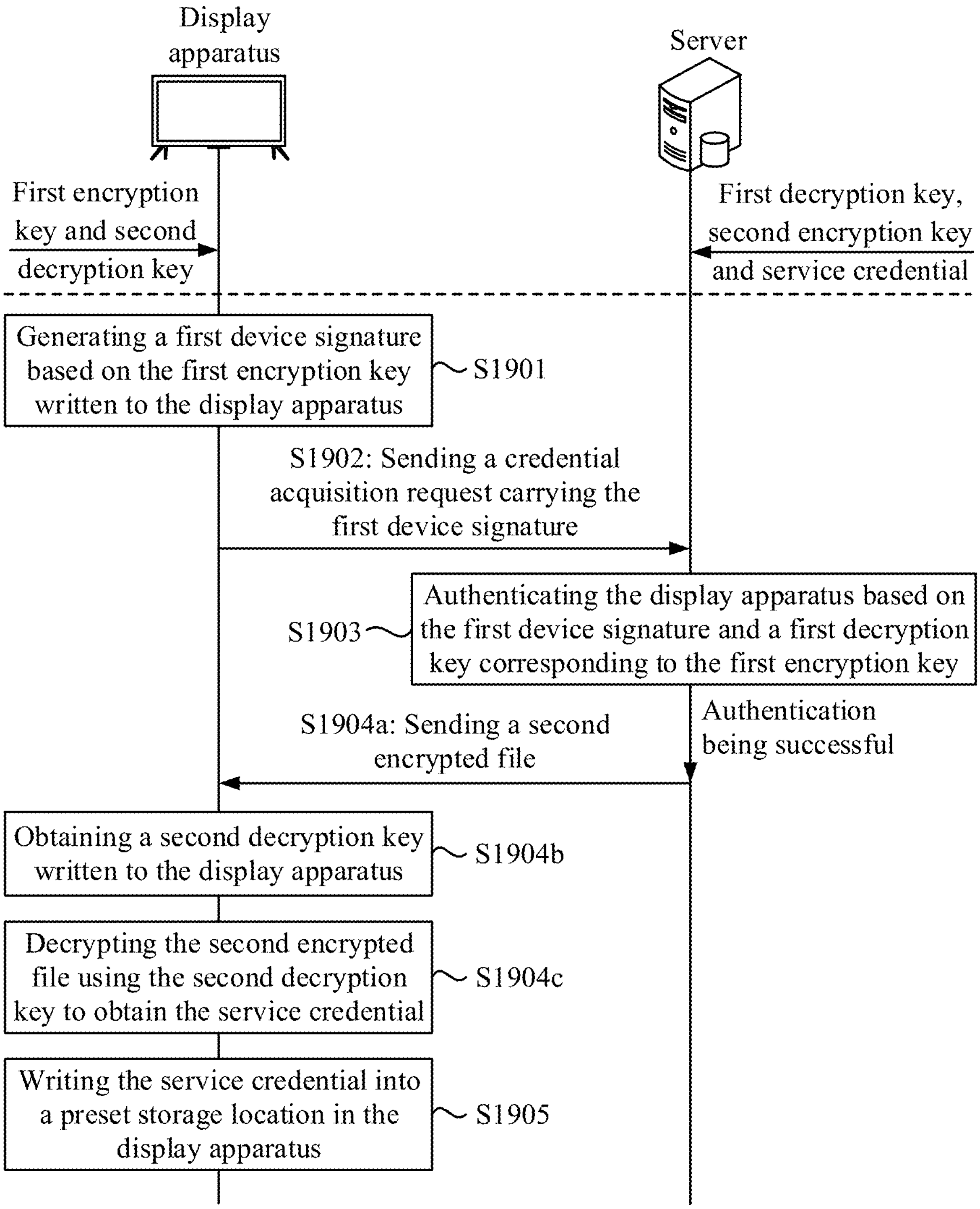
FIG. 22 shows an interaction flowchart of a method for writing a service credential according to some embodiments.

In FIG. 22, the method for the server to obtain the second encrypted file includes an example where the server receives the uploaded service credential and the second encryption key, and encrypts the service credential based on the second encryption key to obtain the second encrypted file. However, in the embodiments of the disclosure, the second encrypted file can be directly uploaded to the server.

Compared to writing the service credential and the second encryption key to the server, writing the second encrypted file to the server can prevent the service credential from being stolen from the server, thereby further enhancing the security of the service credential.

**S1904*b***: the display apparatus obtains a second decryption key written to the display apparatus.

The second decryption key is a decryption key corresponding to the second encryption key.

In some embodiments, the second decryption key can be written to the display apparatus during production.

In some embodiments, the second encryption key and the second decryption key may be keys in a symmetric encryption algorithm. That is, the first encryption key and the first decryption key are the same.

In some implementations, the second encryption key and the second decryption key may be a key pair in an asymmetric encryption algorithm, where the second encryption key is a public key and the second decryption key is a private key in the asymmetric encryption algorithm.

S1904*c*: the display apparatus decrypts the second encrypted file using the second decryption key to obtain the service credential.

Since the server sends the encrypted service credential to the display apparatus in the embodiments of the disclosure, the service credential can be prevented from being stolen during the process of sending from the server to the display apparatus, thereby further enhancing the security of the service credential.

Figure 23:
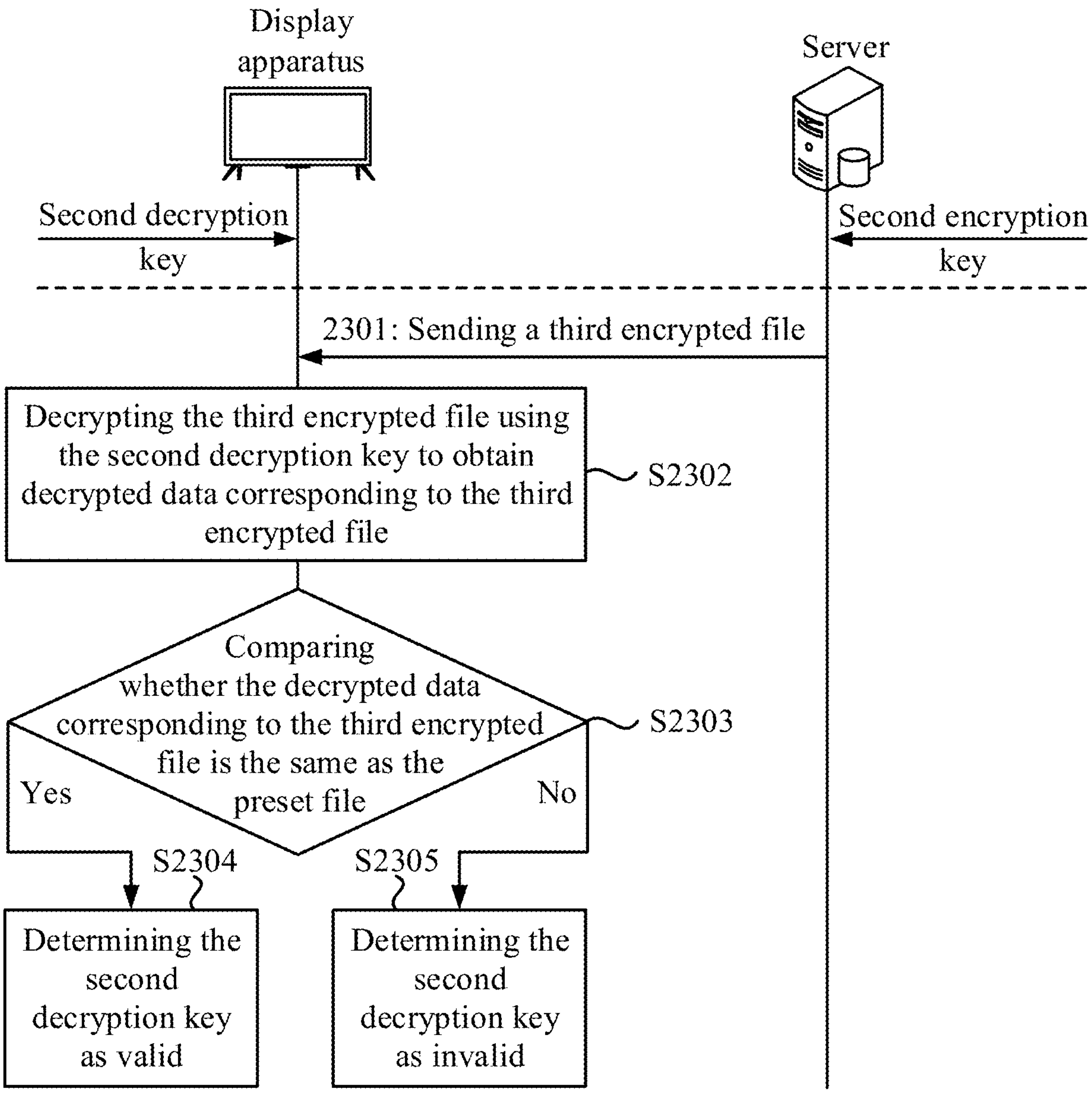
FIG. 23 shows an interaction flowchart of a method for writing a service credential according to some embodiments.

The second decryption key written to the display apparatus may be invalid due to reasons such as not being the decryption key corresponding to the second encryption key, resulting in the display apparatus being unable to decrypt the encrypted service credential (the second encrypted file) after obtaining it from the server. To ensure the validity of the second decryption key written to the display apparatus, after writing the second decryption key to the display apparatus, the method for writing the service credential according to some embodiments can include verifying the validity of the second decryption key written to the display apparatus. Referring to FIG. 23, the process for verifying the validity of the second decryption key written to the display apparatus includes the following steps. S2301: the server sends a third encrypted file to the display apparatus.

Correspondingly, the display apparatus receives the third encrypted file sent from the server.

The third encrypted file is an encrypted file obtained by encrypting a preset file based on the second encryption key.

S2302: the display apparatus decrypts the third encrypted file using the second decryption key to obtain decrypted data corresponding to the third encrypted file.

S2303: the display apparatus compares whether the decrypted data corresponding to the third encrypted file is the same as the preset file.

In step S2303, if the decrypted data corresponding to the third encrypted file is the same as the preset file, then step S2304 is executed; if the decrypted data corresponding to the third encrypted file is different from the preset file, then step S2305 is executed.

S2304: the second decryption key is determined as valid.

S2305: the second decryption key is determined as invalid.

In the above embodiments, after writing the second decryption key to the display apparatus, further verification of the validity of the second decryption key can be carried out. Thus, in the embodiments of the disclosure, situations where the display apparatus is unable to decrypt the encrypted service credential due to an invalid second decryption key being written can be avoided.

Figure 24:
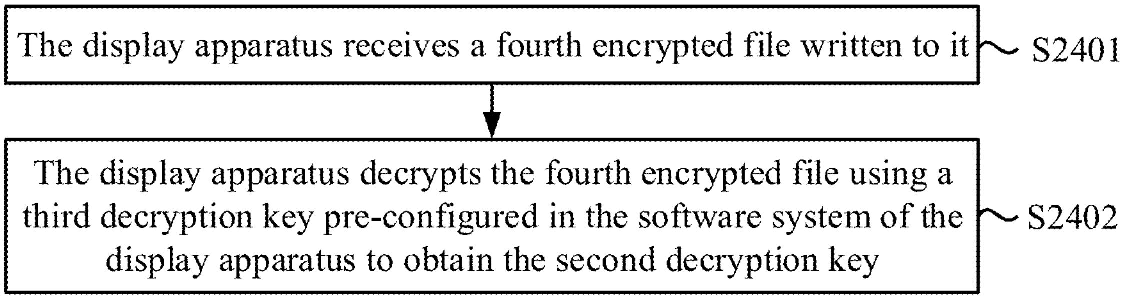
FIG. 24 shows a flowchart, in steps, of a method for writing a service credential according to some embodiments.

The process of writing the second decryption key to the display apparatus generally includes issuing the second decryption key to a manufacturing system of the display apparatus and the manufacturing system writing the second decryption key to the display apparatus. However, after the second decryption key is issued to the manufacturing system, there is a possibility that it could be stolen from the manufacturing system. To prevent the second decryption key from being stolen during the writing process to the display apparatus, referring to FIG. 24, according to some embodiments, the method for writing the second decryption key to the display apparatus may include the following steps. S2401: The display apparatus receives a fourth encrypted file written to it.

The fourth encrypted file is an encrypted file obtained by encrypting the second decryption key based on a third encryption key.

S2402: The display apparatus decrypts the fourth encrypted file using a third decryption key pre-configured in the software system of the display apparatus to obtain the second decryption key.

The third decryption key is the decryption key corresponding to the third encryption key.

That is, the third decryption key is pre-configured in the software system of the display apparatus, and the second decryption key issued to the manufacturing system of the display apparatus is contained in the fourth encrypted file obtained by encrypting the second decryption key with the third encryption key. The manufacturing system directly writes the fourth encrypted file to the display apparatus. The display apparatus then decrypts the fourth encrypted file using the third decryption key to obtain the second decryption key.

In some embodiments, the third encryption key and the third decryption key may be keys in a symmetric encryption algorithm. That is, the third encryption key and the third decryption key are the same.

In some embodiments, the third encryption key and the third decryption key may be a key pair in an asymmetric encryption algorithm, where the third encryption key is a public key and the third decryption key is a private key in the asymmetric encryption algorithm.

Since the second decryption key issued to the manufacturing system of the display apparatus is contained in the fourth encrypted file obtained by encrypting the second decryption key with the third encryption key, even if the second decryption key is stolen, only the ciphertext of the second decryption key can be obtained, while the plaintext of the second decryption key cannot be accessed. Therefore, the above embodiment can prevent the second decryption key from being stolen during the writing process to the display apparatus, thereby enhancing the security of the second decryption key.

In some embodiments, after the display apparatus has been written with the fourth encrypted file, it can decrypt the fourth encrypted file using the third decryption key and store the obtained second decryption key for direct access when needed later.

In some embodiments, the display apparatus can decrypt the fourth encrypted file using the third decryption key only when the second decryption key is needed for use, obtain the second decryption key, and delete it after use. Since the display apparatus also stores the ciphertext of the second decryption key, the embodiments of the disclosure herein can further prevent the second decryption key from being stolen within the display apparatus, thereby further enhancing the security of the second decryption key.

Figure 25:
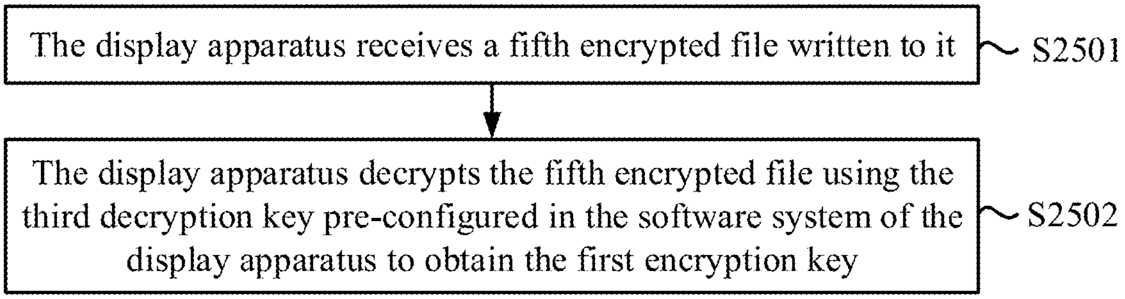
FIG. 25 shows a flowchart, in steps, of a method for writing a service credential according to some embodiments.

The process of writing the first encryption key to the display apparatus generally includes: first issuing the first encryption key to the manufacturing system of the display apparatus, and then the manufacturing system writing the first encryption key to the display apparatus. However, after the first encryption key is issued to the manufacturing system, there is a possibility that the first encryption key is stolen from the manufacturing system. To prevent the first encryption key from being stolen during the writing process to the display apparatus, referring to FIG. 25, the method for writing the first encryption key to the display apparatus according to some embodiments may include the following steps.

S2501: The display apparatus receives a fifth encrypted file written to it.

The fifth encrypted file is an encrypted file obtained by encrypting the first encryption key based on the third encryption key.

S2502: The display apparatus decrypts the fifth encrypted file using the third decryption key pre-configured in the software system of the display apparatus to obtain the first encryption key.

The third decryption key is the decryption key corresponding to the third encryption key.

That is, the third decryption key is pre-configured in the software system of the display apparatus, and the first encryption key issued to the manufacturing system of the display apparatus is contained in the fifth encrypted file obtained by encrypting the first encryption key with the third encryption key. The manufacturing system directly writes the fifth encrypted file to the display apparatus, which then decrypts the fifth encrypted file using the third decryption key to obtain the first encryption key.

Since the first encryption key issued to the manufacturing system of the display apparatus is contained in the fifth encrypted file obtained by encrypting the first encryption key with the third encryption key, even if the first encryption key is stolen, only the ciphertext of the first encryption key can be obtained, while the plaintext of the first encryption key cannot be accessed. Therefore, the above embodiment can prevent the first encryption key from being stolen during the writing process to the display apparatus, thereby enhancing the security of the first encryption key.

In some embodiments, after the display apparatus has been written with the fifth encrypted file, it can decrypt the fifth encrypted file using the third decryption key and store the obtained first encryption key for direct access when needed later.

In some embodiments, the display apparatus can decrypt the fifth encrypted file using the third decryption key only when the first encryption key is needed for use, obtain the first encryption key, and delete it after use. Since the display apparatus stores the ciphertext of the first encryption key, the embodiments of the disclosure herein can further prevent the first encryption key from being stolen within the display apparatus, thereby further enhancing the security of the first encryption key.

What is claimed is:

1. A display apparatus, comprising:

a communicating device, comprising a WiFi module and a Bluetooth module and configured to communicate with a casting data source device;

a display, configured to display an image from a broadcast system and/or a network, and/or a user interface;

a memory, configured to store computer instructions and data associated with the display; and a processor, communicating with the communicating device, the display, and the memory; wherein the processor is configured to execute the computer instructions to cause the display apparatus to perform:

in response to a channel-switching instruction, switching from a current channel to a casting channel;

in response to a casting instruction sent from the casting data source device, checking a network status of the Wi-Fi module and a casting switch status;

in response to the network status indicating that the network is disconnected, controlling the Wi-Fi module to enable network connection and to connect to a target network; and/or in response to the casting switch status indicating that a casting switch is off, controlling the casting switch to be turned on; and obtaining casting data sent from the casting data source device via the target network, and controlling the display to display the casting data on an interface for the casting channel, receiving a return instruction generated by the user operating a return button on a control device;

in response to the return instruction, determining whether the display is showing a casting information page which meets a requirement of a casting protocol;

based on determining that the display is showing the casting information page, controlling the display to switch to a specified page and determining a data source object that is active before the display apparatus displaying the casting information page;

controlling the display to switch to a specified page corresponding to the data source object, different data source objects corresponding to different specified pages;

based on that the data source object that is active before the display apparatus displaying the casting information page is a signal source supported by the display apparatus, controlling the display to switch to a desktop of an operating system of the display apparatus; and based on that the data source object that is active before the display apparatus displaying the casting information page is an application installed in an application layer of the operating system of the display apparatus, controlling the display to switch to a homepage of the application, and wherein the processor is further configured to execute the computer instructions to cause the display apparatus to perform:

obtaining a custom parameter;

determining whether a value of the custom parameter equals to a preset value;

based on that the value of the custom parameter equals to the preset value, determining that the data source object that is active before the display apparatus displaying the casting information page is the signal source supported by the display apparatus;

based on that the value of the custom parameter is not equal to the preset value, determining that the data source object that is active before the display apparatus displaying the casting information page is the application installed in the application layer of the operating system of the display apparatus.

2. The display apparatus according to claim 1, wherein the processor is further configured to execute the computer instructions to cause the display apparatus to perform:

after controlling the WiFi module to enable the network connection and connecting to the target network, and before obtaining the casting data sent from the casting data source device via the target network and controlling the display to display the casting data on the interface for the casting channel, controlling the display to display a first prompt indicating that the network connection is being enabled and the network being connected;

determining, within a preset time, whether the network connection is successful;

in response to that the network connection fails, controlling the display to display a network setting interface, wherein the network setting interface comprises a network switch control and identifiers of a plurality of available networks;

receiving a selection input on a target network identifier from a user on the network setting interface; and in response to the selection input, attempting to connect to the target network indicated by the target network identifier.

3. The display apparatus according to claim 1, wherein the processor is further configured to execute the computer instructions to cause the display apparatus to perform:

after checking the network status of the Wi-Fi module and the casting switch status and before controlling the Wi-Fi module to enable the network connection and connecting to the target network, in response to the network status indicating that the network is disconnected, controlling the display to display a network setting interface, wherein the network setting interface comprises a network switch control and identifiers of a plurality of available networks;

obtaining a first input for enabling the network connection on the network switch control in the network setting interface from a user;

in response to the first input, controlling the WiFi module to enable the network connection and connecting to the target network.

4. The display apparatus according to claim 1, wherein the processor is further configured to execute the computer instructions to cause the display apparatus to perform:

after checking the network status and the casting switch status and before controlling the casting switch to be turned on, in response to the casting switch status indicating that the casting switch is off, controlling the display to display a casting switch setting interface, wherein the casting switch setting interface comprises a casting switch control;

obtaining a second input for turning on the casting switch on the casting switch control in the casting switch setting interface from a user;

in response to the second input, controlling the casting switch to be turned on.

5. The display apparatus according to claim 1, wherein the processor is further configured to execute the computer instructions to cause the display apparatus to perform:

after checking the network status of the Wi-Fi module and the casting switch status and before obtaining the casting data sent from the casting data source device via the target network and controlling the display to display the casting data on the interface for the casting channel, checking a resource update status in response to the casting instruction;

in response to the resource update status indicating no resource update, downloading a casting resource of a target version; and performing resource updating based on the casting resource of the target version.

6. The display apparatus according to claim 5, wherein the casting resource comprises a casting key, and the processor is further configured to execute the computer instructions to cause the display apparatus to perform:

while obtaining the casting data sent from the casting data source device via the target network and controlling the display to display the casting data on the interface for the casting channel, decrypting the casting data sent from the casting data source device using an updated casting key, and controlling the display to display decrypted casting data.

7. The display apparatus according to claim 1, wherein the processor is further configured to execute the computer instructions to cause the display apparatus to perform:

based on determining that the display is showing the casting information page, invoking a casting Software Development Kit (SDK) in the display apparatus to broadcast the return instruction to a casting application, to allow the casting application to control the display to switch to the specified page in response to the return instruction.

8. The display apparatus according to claim 7, wherein the processor is further configured to execute the computer instructions to cause the display apparatus to perform:

forwarding the return instruction to a startup service by invoking the casting SDK; and broadcasting the return instruction by invoking the startup service, to send the return instruction to the casting application.

9. The display apparatus according to claim 1, wherein the memory is further configured to write a service credential to a preset storage location of the display apparatus;

the communicating device is further configured to send a credential acquisition request carrying a first device signature to a server, wherein the credential acquisition request is used for requesting the server to return a service credential corresponding to the display apparatus to the display apparatus based on the server determining that the display apparatus has passed authentication according to the first device signature, and receive the service credential sent from the server;

the processor is further configured to execute the computer instructions to cause the display apparatus to perform:

generating the first device signature based on a first encryption key written to the display apparatus.

10. The display apparatus according to claim 9, wherein the processor is further configured to execute the computer instructions to cause the display apparatus to perform:

encrypting a first file with the first encryption key to obtain a first encrypted file;

obtaining abstract information of the first file based on a preset algorithm;

generating the first device signature based on the first encrypted file and the abstract information.

11. The display apparatus according to claim 9, wherein the communicating device is further configured to send an authentication request carrying a second device signature and receive a authentication response from the server; wherein the authentication request is used for requesting the server to authenticate the display apparatus based on the second device signature;

the processor is further configured to execute the computer instructions to cause the display apparatus to perform:

after writing the first encryption key to the display apparatus, generating the second device signature based on the first encryption key;

based on the authentication response indicating that the display apparatus has passed the authentication, determining that the first encryption key is valid;

based on the authentication response indicating that the display apparatus has failed the authentication, determining that the first encryption key is invalid.

12. The display apparatus according to claim 9, wherein the communicating device is further configured to:

receive a second encrypted file sent from the server, wherein the second encrypted file is obtained by encrypting the service credential with a second encryption key;

obtain a second decryption key written to the display apparatus, wherein the decryption key corresponds to the second encryption key;

decrypt the second encrypted file with the second decryption key to obtain the service credential.

13. The display apparatus according to claim 12, wherein the communicating device is further configured to receive a third encrypted file sent from the server after writing the second decryption key to the display apparatus; wherein the third encrypted file is obtained by encrypting a preset file with the second encryption key;

the processor is further configured to execute the computer instructions to cause the display apparatus to perform:

decrypting the third encrypted file using the second decryption key to obtain decrypted data;

based on that the decrypted data is consistent with the preset file, determining that the second decryption key is valid;

based on that the decrypted data is not consistent with the preset file, determining that the second decryption key is invalid.

14. The display apparatus according to claim 12, wherein the memory is further configured to receive a fourth encrypted file written to the display apparatus, and the fourth encrypted file is obtained by encrypting the second decryption key with a third encryption key;

the processor is further configured to execute the computer instructions to cause the display apparatus to perform:

decrypting the fourth encrypted file based on a third decryption key pre-configured in a software system of the display apparatus to obtain the second decryption key;

wherein the third decryption key corresponds to the third encryption key.

15. The display apparatus according to claim 9, wherein the memory is further configured to a fifth encrypted file written to the display apparatus, and the fifth encrypted file is obtained by encrypting the first encryption key with a third encryption key;

the processor is further configured to execute the computer instructions to cause the display apparatus to perform:

decrypting the fifth encrypted file based on a third decryption key pre-configured in a software system of the display apparatus to obtain the first encryption key;

wherein the third decryption key corresponds to the third encryption key.

16. A control method for a display apparatus, comprising:

in response to a channel-switching instruction, switching from a current channel to a casting channel;

in response to a casting instruction sent from the casting data source device, checking a network status of the Wi-Fi module and a casting switch status;

in response to the network status indicating that the network is disconnected, controlling the Wi-Fi module to enable network connection and to connect to a target network; and/or in response to the casting switch status indicating that a casting switch is off, controlling the casting switch to be turned on; and obtaining casting data sent from the casting data source device via the target network, and controlling the display to display the casting data on an interface for the casting channel, wherein the method further comprises:

receiving a return instruction generated by the user operating a return button on a control device;

in response to the return instruction, determining whether the display is showing a casting information page which meets a requirement of a casting protocol;

based on determining that the display is showing the casting information page, controlling the display to switch to a specified page and determining a data source object that is active before the display apparatus displaying the casting information page;

controlling the display to switch to a specified page corresponding to the data source object, different data source objects corresponding to different specified pages;

based on that the data source object that is active before the display apparatus displaying the casting information page is a signal source supported by the display apparatus, controlling the display to switch to a desktop of an operating system of the display apparatus; and based on that the data source object that is active before the display apparatus displaying the casting information page is an application installed in an application layer of the operating system of the display apparatus, controlling the display to switch to a homepage of the application, and wherein determining the data source object that is active before the display apparatus displaying the casting information page comprises:

obtaining a custom parameter;

determining whether a value of the custom parameter equals to a preset value;

based on that the value of the custom parameter equals to the preset value, determining that the data source object that is active before the display apparatus displaying the casting information page is the signal source supported by the display apparatus;

based on that the value of the custom parameter is not equal to the preset value, determining that the data source object that is active before the display apparatus displaying the casting information page is the application installed in the application layer of the operating system of the display apparatus.

* * * * *